(12) United States Patent
Perkins

(10) Patent No.: US 10,107,342 B2
(45) Date of Patent: *Oct. 23, 2018

(54) VISCOUS ROTATIONAL SPEED CONTROL DEVICE WITH FLUID CIRCUIT

(71) Applicant: Nelson Irrigation Corporation, Walla Walla, WA (US)

(72) Inventor: Lee A. Perkins, Walla Walla, WA (US)

(73) Assignee: NELSON IRRIGATION CORPORATION, Walla Walla, WA (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/239,123

(22) Filed: Aug. 17, 2016

(65) Prior Publication Data

US 2016/0356327 A1 Dec. 8, 2016

Related U.S. Application Data

(63) Continuation-in-part of application No. PCT/US2016/013173, filed on Jan. 13, 2016, and a
(Continued)

(51) Int. Cl.
*B05B 3/00* (2006.01)
*F16D 57/00* (2006.01)
(Continued)

(52) U.S. Cl.
CPC .............. *F16D 57/02* (2013.01); *B05B 3/005* (2013.01); *B05B 15/70* (2018.02); *B60T 10/02* (2013.01);
(Continued)

(58) Field of Classification Search
CPC ......... B05B 3/001; B05B 3/002; B05B 3/003; B05B 3/026; B05B 3/06; B05B 3/005;
(Continued)

(56) References Cited

U.S. PATENT DOCUMENTS 1,521,583 A * 12/1924 Whitcomb ................ F16F 7/06
16/82
2,942,711 A 6/1960 Zindler
(Continued)

FOREIGN PATENT DOCUMENTS

| DE | 10 2011 112 773 | 3/2012 |
|---|---|---|
| WO | WO 2015/041811 | 3/2015 |
| WO | WO 2016/115210 | 7/2016 |

OTHER PUBLICATIONS

XCAD USA website http://www.xcadusa.com/projects.html, Self-Governing Sprinkler, Nov. 2014.
(Continued)

*Primary Examiner* — Robert A. Siconolfi
*Assistant Examiner* — San M Aung
(74) *Attorney, Agent, or Firm* — Nixon & Vanderhye P.C.

(57) ABSTRACT

A rotational speed control device includes a housing containing a viscous fluid and a shaft disposed in the housing and rotatable relative to the housing. A rotor may be movable axially on the shaft depending on the rotating speed of the shaft. The rotor is biased in a low torque direction. A braking torque between the rotor and the housing and/or between the rotor and a drive control ring is varied according to an axial position of the rotor on the shaft. The device may incorporate bypass channels to control a circulating pressure of the viscous fluid.

18 Claims, 49 Drawing Sheets

Related U.S. Application Data continuation of application No. 14/986,338, filed on Dec. 31, 2015, now Pat. No. 9,657,790, and a continuation of application No. 14/789,415, filed on Jul. 1, 2015, now Pat. No. 9,587,687, and a continuation of application No. 14/699,445, filed on Apr. 29, 2015, now Pat. No. 9,995,352.

(60) Provisional application No. 62/103,168, filed on Jan. 14, 2015.

(51) Int. Cl.
  *F16D 57/02* (2006.01)
  *B05B 15/70* (2018.01)
  *B60T 10/02* (2006.01)
  *A01G 25/09* (2006.01)

(52) U.S. Cl.
  CPC .......... *F16D 57/007* (2013.01); *A01G 25/092* (2013.01)

(58) Field of Classification Search
  CPC ......... B05B 3/0427; B05B 3/045; B05B 1/14; B05B 1/34; B05B 1/042; B05B 1/048; B05B 13/0636; B05B 15/005; F16C 17/105; F16C 17/18; F16C 17/026; F16D 57/007; F16D 57/02; F16F 9/12; F16F 9/14; F16F 15/0235; F16F 2232/06
  USPC ....... 188/296, 290, 293, 306, 310, 308, 309, 188/294, 82.1, 82.5, 184, 185, 322.5, 291; 239/252
  See application file for complete search history.

(56) References Cited

U.S. PATENT DOCUMENTS

| | | | |
|---|---|---|---|
| 3,272,289 A * | 9/1966 | Vermont | F16F 15/0235 188/290 |
| 3,576,242 A | 4/1971 | Mumma | |
| 3,861,503 A | 1/1975 | Nash | |
| 3,971,463 A | 7/1976 | Zindler | |
| 4,194,600 A | 3/1980 | Armasow et al. | |
| 4,231,237 A | 11/1980 | Bochan | |
| 4,440,345 A | 4/1984 | Figwer et al. | |
| 4,660,766 A | 4/1987 | Nelson et al. | |
| 4,783,004 A | 11/1988 | Lockwood | |
| 4,796,811 A | 1/1989 | Davisson | |
| 4,815,662 A | 3/1989 | Hunter | |
| 4,819,779 A | 4/1989 | Nickel | |
| 5,007,586 A | 4/1991 | Cohen | |
| 5,141,158 A | 8/1992 | Allen | |
| 5,560,465 A | 10/1996 | Zindler | |
| 5,909,848 A * | 6/1999 | Zink | B05B 3/003 188/184 |
| 6,814,304 B2 | 11/2004 | Onofrio | |
| 6,864,591 B2 | 3/2005 | DeFrank | |
| 7,510,062 B2 | 3/2009 | Derr | |
| 8,272,578 B1 | 9/2012 | Clark et al. | |
| 8,439,172 B2 * | 5/2013 | Lee | A47K 13/12 16/330 |
| 8,544,768 B2 | 10/2013 | Wright | |
| 8,678,029 B2 | 3/2014 | Ungerecht | |
| 8,827,055 B2 | 9/2014 | Winkler | |
| 8,991,726 B2 | 3/2015 | Kah, Jr. | |
| 2002/0153432 A1 * | 10/2002 | McKenzie | B05B 3/0431 239/237 |
| 2002/0185344 A1 * | 12/2002 | Mills | F16D 55/02 188/184 |
| 2004/0108391 A1 * | 6/2004 | Onofrio | B05B 3/003 239/201 |
| 2005/0109541 A1 * | 5/2005 | Marvin | B05B 3/002 175/67 |
| 2005/0269177 A1 | 12/2005 | Vogelsang | |
| 2006/0113154 A1 | 6/2006 | Hayashi | |
| 2007/0181711 A1 | 8/2007 | Sesser | |
| 2008/0257982 A1 | 10/2008 | Kah et al. | |
| 2009/0151121 A1 * | 6/2009 | Lin | E05F 3/20 16/321 |
| 2010/0270113 A1 | 10/2010 | Ogawa | |
| 2011/0024523 A1 | 2/2011 | Sesser et al. | |
| 2011/0084151 A1 | 4/2011 | Dunn | |
| 2011/0108636 A1 * | 5/2011 | Wright | B05B 3/002 239/251 |
| 2011/0198126 A1 * | 8/2011 | Swietlik | E21B 17/07 175/55 |
| 2012/0048651 A1 | 3/2012 | Rinklake | |
| 2015/0083536 A1 * | 3/2015 | Andersen | B05B 3/005 188/290 |
| 2016/0201742 A1 | 7/2016 | Perkins | |
| 2016/0201743 A1 | 7/2016 | Sesser | |
| 2016/0201744 A1 | 7/2016 | Sesser | |
| 2016/0243564 A1 | 8/2016 | Andersen | |

OTHER PUBLICATIONS

U.S. Office Action dated Jan. 18, 2017 issued in U.S. Appl. No. 14/699,445, 10 pp.
U.S. Office Action dated Jan. 11, 2017 issued in U.S. Appl. No. 14/986,338, 8 pp.
Australian Examination Report No. 1 dated Jun. 8, 2018 issued in Australian Patent Application No. 2016206817, 5 pages.
Australian Examination Report No. 1 dated Jun. 8, 2018 issued in Australian Patent Application No. 2017208344, 5 pages.

* cited by examiner

VISCOUS ROTATIONAL SPEED CONTROL DEVICE WITH FLUID CIRCUIT

CROSS-REFERENCES TO RELATED APPLICATIONS

This application is a continuation-in-part (CIP) of PCT International Patent Application No. PCT/US2016/013173, filed Jan. 13, 2016, which claims the benefit of U.S. Provisional Patent Application No. 62/103,168, filed Jan. 14, 2015, U.S. patent application Ser. No. 14/699,445, filed Apr. 29, 2015, U.S. patent application Ser. No. 14/789,415, filed Jul. 1, 2015, and U.S. patent application Ser. No. 14/986,338, filed Dec. 31, 2015, the entire contents of each of which are hereby incorporated by reference in this application.

STATEMENT REGARDING FEDERALLY SPONSORED RESEARCH OR DEVELOPMENT (NOT APPLICABLE)

BACKGROUND OF THE INVENTION

It is desirable to maintain a relatively constant speed of rotation of an irrigation sprinkler regardless of nozzle size or pressure (i.e., mass flow rate and fluid velocity). This invention results in a large increase in braking torque for a small increase in rotational speed and therefore minimizes the change in rotational speed of the irrigation sprinkler when nozzle size or pressure is changed.

For many years, a braking system has been in use for sprinkler deflector plates that utilizes a rotor that is immersed in a viscous fluid. The rotor is connected to a shaft which transmits the energy of the rotating sprinkler or deflector plate into the viscous-braking mechanism. The rotor, viscous fluid and a portion of the shaft are contained within a sealed housing. As the shaft and rotor rotate, the viscous fluid is sheared between the rotor and the housing. As the shear rate increases, the braking torque that retards the shaft rotation also increases. As a matter of operation, the shear rate increases due to an increase in the rotational speed of the shaft and therefore the surface speed of the rotor. As a matter of design, the shear rate can be increased by decreasing the gap between the rotor and the housing.

It is desirable to avoid requiring the shaft to move axially in and out of the housing. Axial movement can drag water and other contaminants into the seal and thereby cause water intrusion and/or excessive wear. Additionally, as the shaft moves into the housing, it pressurizes the fluid chamber, which can cause excess seal friction and seal wear unless an expansion chamber is added.

BRIEF SUMMARY OF THE INVENTION

In some embodiments of this invention, the gap between the rotor and the housing is changed automatically in response to changes in rotational speed of the shaft. The rotor is attached to the shaft in a manner that causes it to rotate with the shaft but allows it to move axially relative to the shaft. The rotor is designed with an impeller-like feature to create an axial force when it is rotated in the viscous fluid. The magnitude of the axial force is proportional to the rotational speed of the rotor. A spring mechanism is located within the housing in such a way as to resist the axial force of the rotor. The axial force of the rotor compresses the spring mechanism until the spring force matches the axial force being generated by the rotation of the shaft and rotor. These balancing forces are used to determine the axial position of the rotor within the housing.

When the rotational speed of the input shaft changes due to changing pressures or nozzle size of the sprinkler, the rotor moves to a new axial position. The rotor is designed to cooperate with the housing or other nonrotating features within the housing to vary the shear gap in response to the axial position of the rotor. The rotor, housing and spring mechanism can be designed to cooperate to create large changes in braking torque in response to small changes in rotational speed of the input shaft. This allows the sprinkler or deflector plate rotation speed to be controlled within a relatively narrow range.

Alternatively, the structure may be configured to use vanes to create radial movement rather than axial movement. Other alternate embodiments use mating threads working against either compression or torsional springs to create axial movement. Another alternate embodiment uses mechanical friction in addition to viscous fluid shear to create the braking torque.

BRIEF DESCRIPTION OF THE DRAWINGS

These and other aspects and advantages will be described in detail with reference to the accompanying drawings, in which.

DETAILED DESCRIPTION OF THE INVENTION

Figure 1:
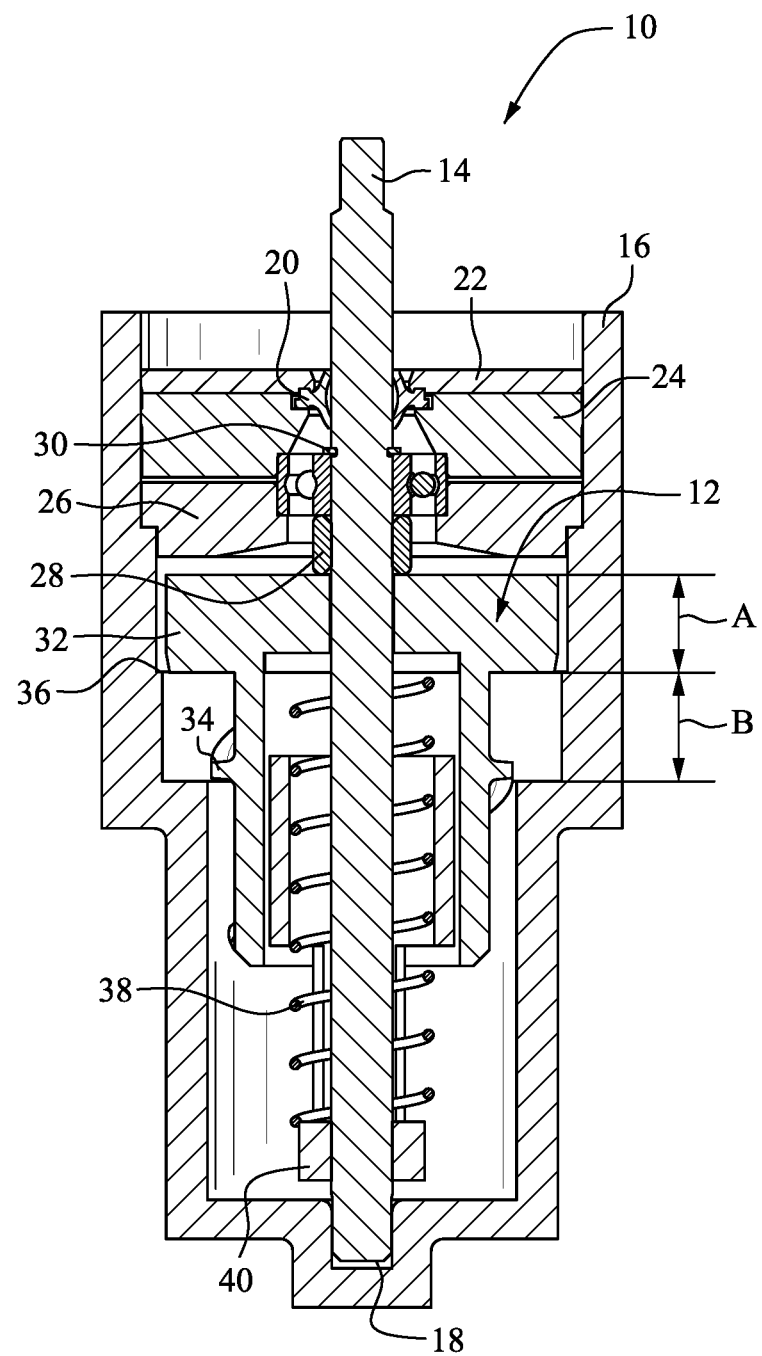
FIG. 1 shows an exemplary rotational speed control device in a low-braking stage.

The figures show several embodiments of a viscous rotational speed control device 10. With reference to FIG. 1, a rotor 12 is rotatable with a shaft 14 in a housing 16. The deflector plate 15 is secured to the shaft 14 for rotation with the shaft 14. (See, e.g., FIG. 15.) The housing 16 is filled with a viscous fluid such as high-viscosity silicone fluid or the like. The housing 16 is closed at a bottom end and includes a recess or channel 18 for receiving the shaft 14. A seal 20 secured with a seal retainer 22 contains the viscous fluid within the housing 16.

A retaining ring 30 and a bearing retainer 28 are used to axially locate the ball bearing on the shaft 14. A lower bearing support 26 and an upper bearing support 24 cooperate to axially and radially locate the shaft bearing assembly in the housing 16. FIGS. 1-10 and 13 utilize a ball bearing to support the axial and radial load that the water imparts on the shaft 14. The axial load is transmitted to the housing 16 via the lower bearing support 26.

The rotor 12 includes a braking section 32 and an impeller 34. The clearance between the braking section 32 and an inner wall of the housing 16 is directly related to the amount of braking. In section A shown in FIG. 1, the clearance between the braking section 32 of the rotor and the inner wall of the housing 16 is relatively large for low-braking. The inner wall of the housing 16 includes a step 36 that narrows the clearance between the braking section 32 of the rotor 12 and the inner wall of the housing 16. The smaller clearance provides for greater braking.

A spring mechanism such as a balancing spring 38 acts on the rotor 12 and urges the rotor 12 toward the high-clearance, low-braking position shown in FIG. 1. The balancing spring is secured via a spring retainer 40. As the shaft 14 and rotor 12 are rotated, the impeller 34 drives the rotor axially against the force of the spring 38. The clearance between the impeller 34 and the inside wall of the housing 16 is relatively small to enable the impeller to more effectively drive the axial position of the rotor 12. The axial force of the rotor 12 compresses the spring 38 until the spring force matches the axial force being generated by the rotation of the shaft 14 and rotor 12. When the rotational speed of the input shaft 14 changes due to changing pressures or nozzle size of the sprinkler, the rotor 12 moves to a new axial position. The spring mechanism may comprise any suitable structure for providing the bias, for example, opposing magnets or equivalent structure.

Figure 2:
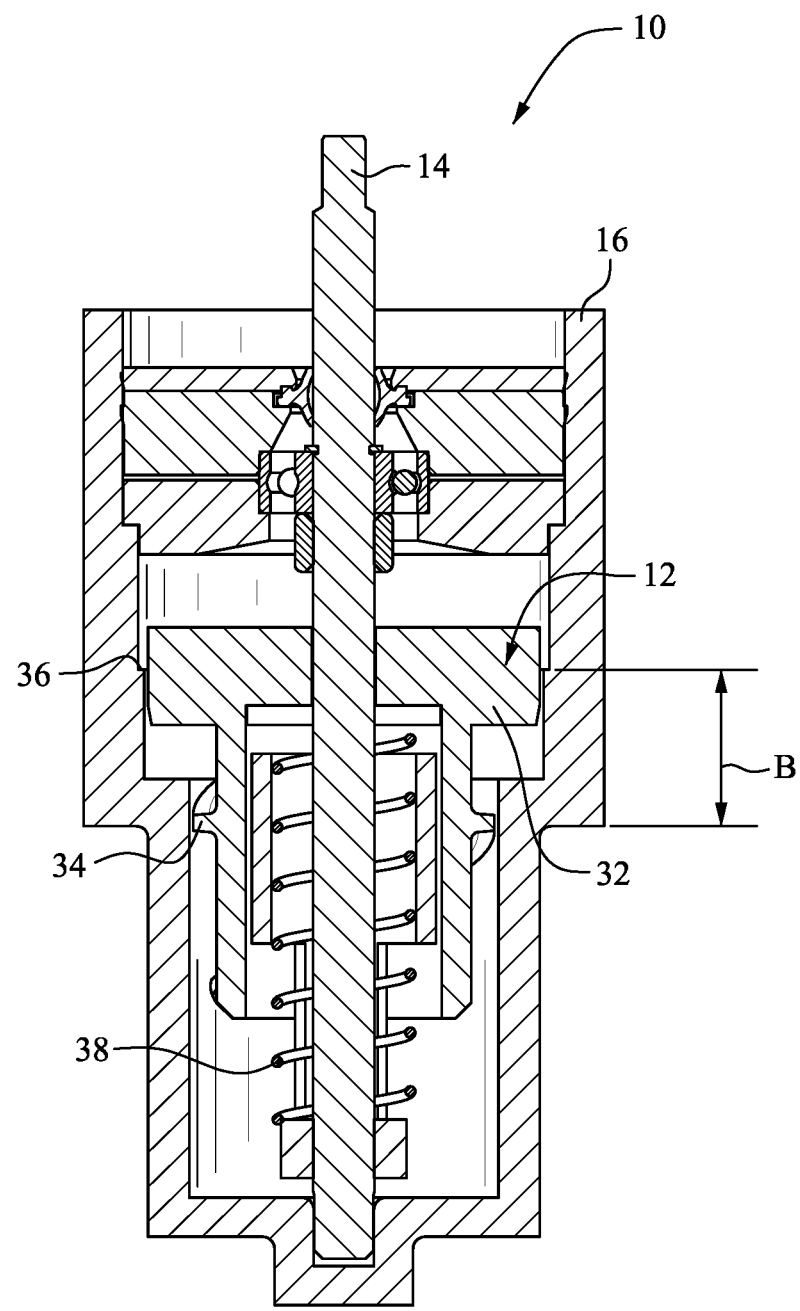
FIG. 2 shows the rotational speed control device of FIG. 1 transitioning between the low-braking stage and the high-braking stage.
Figure 3:
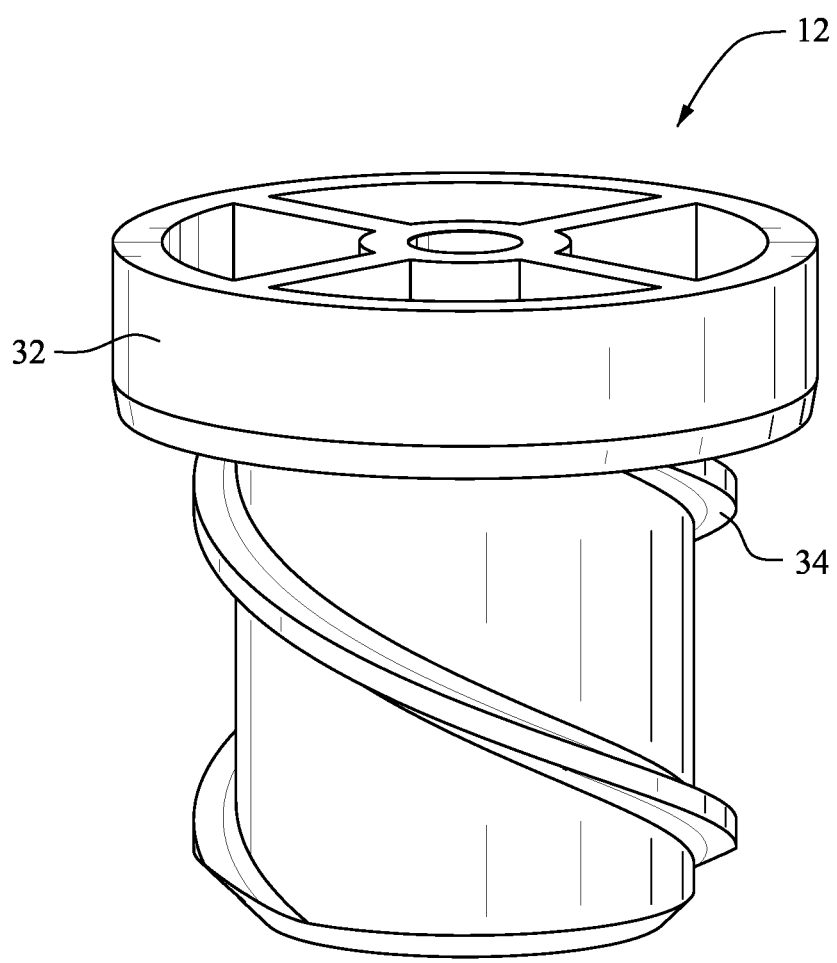
FIG. 3 shows the rotor.

FIG. 2 shows the rotor 12 displaced axially by an increase in the rotationally developed axial force. The rotor 12 is displaced such that at least a portion of the braking section 32 is disposed adjacent the small clearance section B of the inner wall of the housing 16. By virtue of the smaller clearance, a greater braking resistance is provided. FIG. 3 is an isolated view of the rotor 12.

Figure 4:
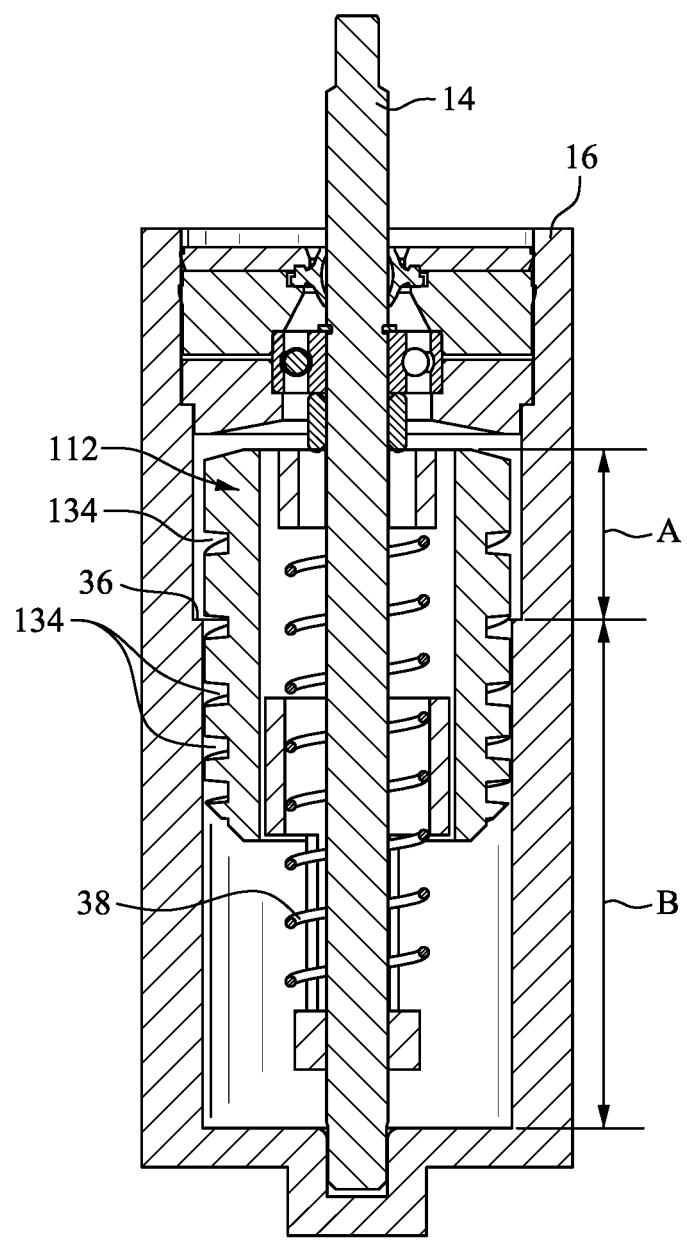
FIG. 4 shows an alternative embodiment of the rotational speed control device with a modified rotor.
Figure 5:
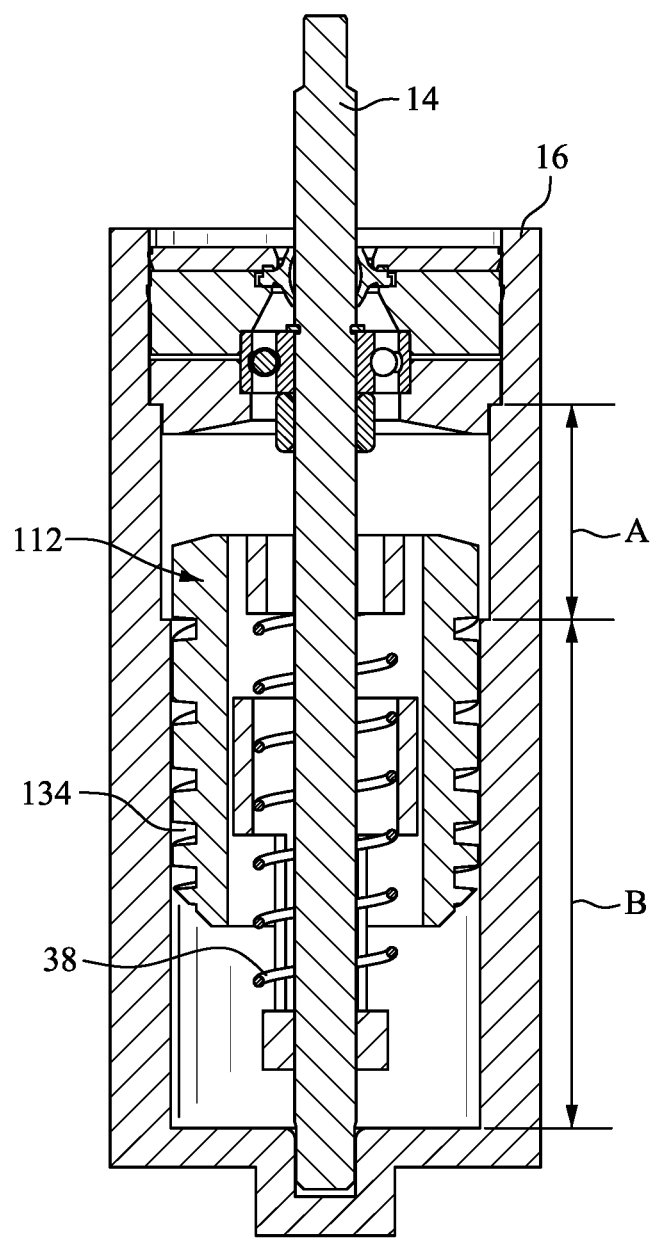
FIG. 5 shows the embodiment of FIG. 4 in an intermediate-braking position.
Figure 6:
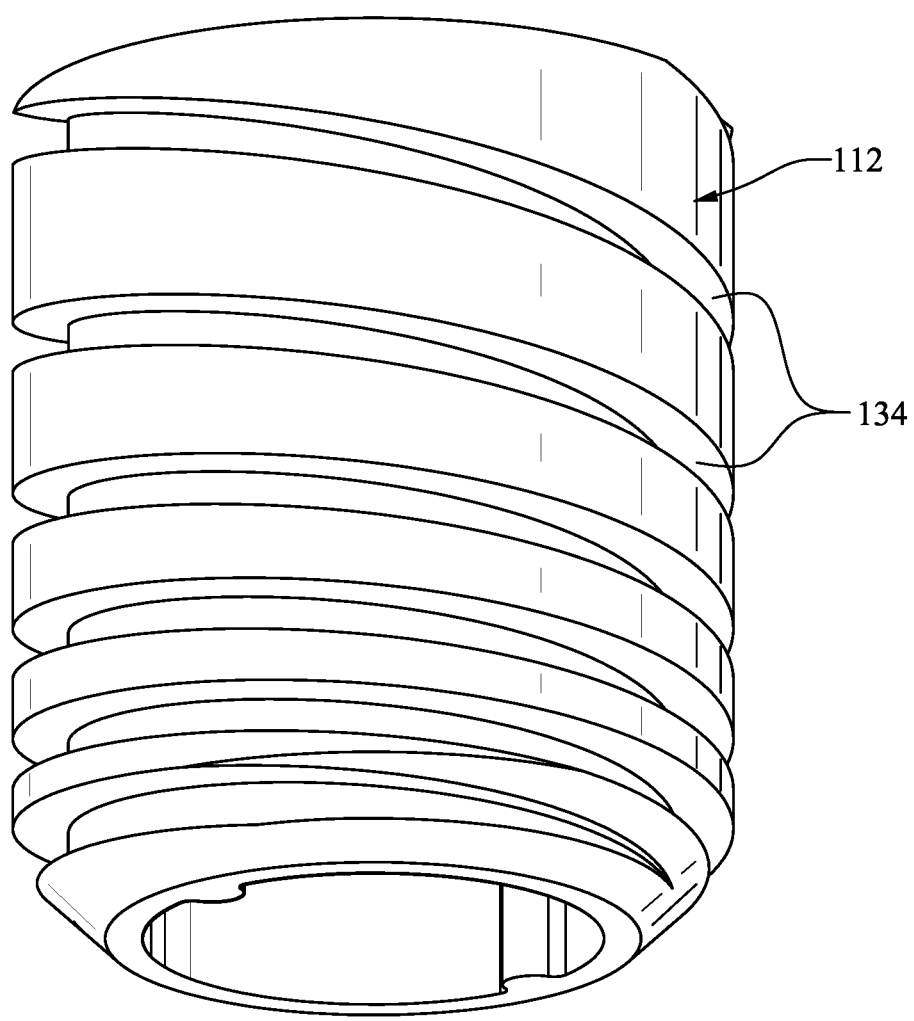
FIG. 6 shows the rotor for the embodiment of FIGS. 4 and 5.

FIGS. 4 and 5 show an alternative embodiment. In this embodiment, the rotor 112 is generally cylindrical and is provided with screw thread slots 134 that define the impeller for driving an axial position of the rotor 112. The inner wall of the housing 16 includes the step 36 such that with slower rotation, a larger portion of the rotor 112 is positioned adjacent the large clearance section A of the housing for lower braking. In the smaller clearance section B, the screw impeller/screw thread slots 134 can more effectively drive, and the smaller clearance creates relatively high-shear braking on the thread major diameter for higher braking at higher rotation speeds. With reference to FIG. 5, as the screw impeller 134 drives deeper, more of its major diameter is in the low-clearance section B, which creates more shear area and therefore, more braking. In FIGS. 4 and 5, the screw thread has a relatively short pitch with a broad thread crest. The shearing action that creates the braking is done primarily between the thread crest (major diameter) and the housing 16. FIGS. 4 and 5 show the rotor having a variable pitch screw thread with the pitch getting greater at the top. This is to create progressively wider thread crests and more area subject to the high shear that occurs in the smaller clearance section B. This style of rotor may have a variable pitch as shown or a constant pitch depending on the desired performance. FIG. 6 is an isolated view of the rotor 112.

Figure 7:
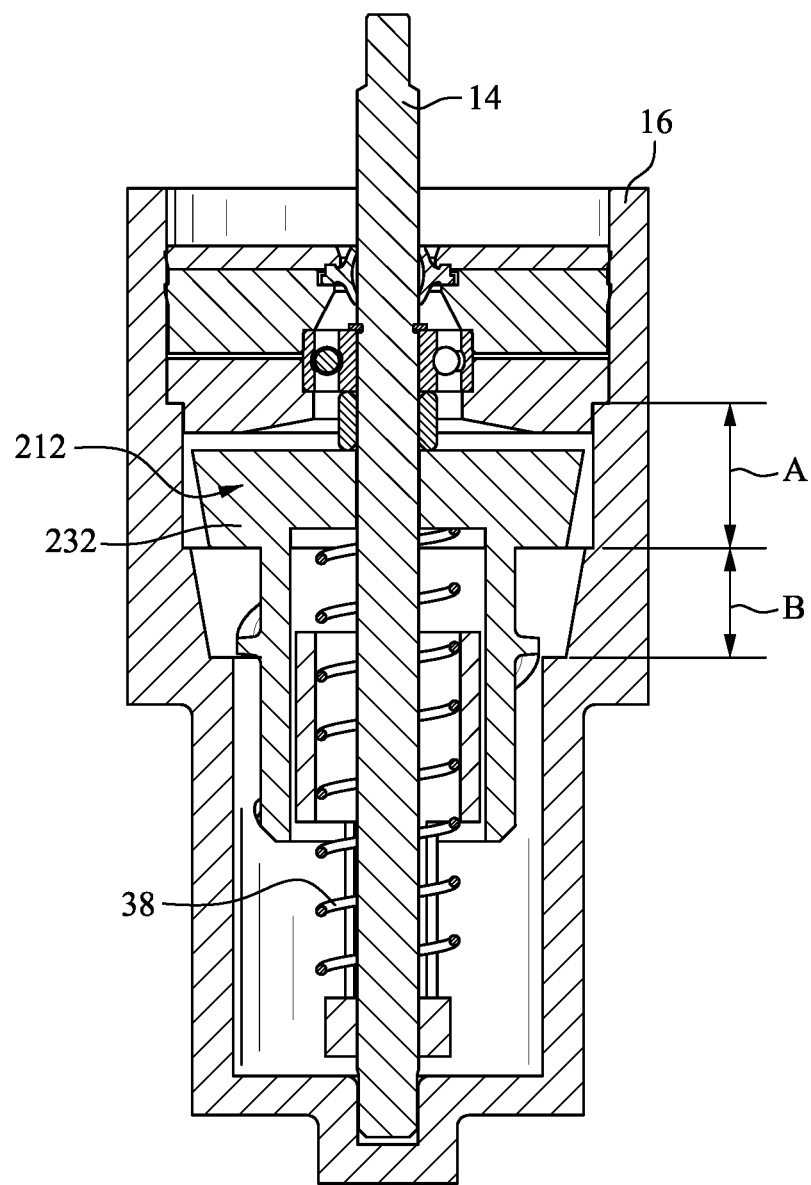
FIG. 7 is a sectional view of an alternative embodiment.
Figure 8:
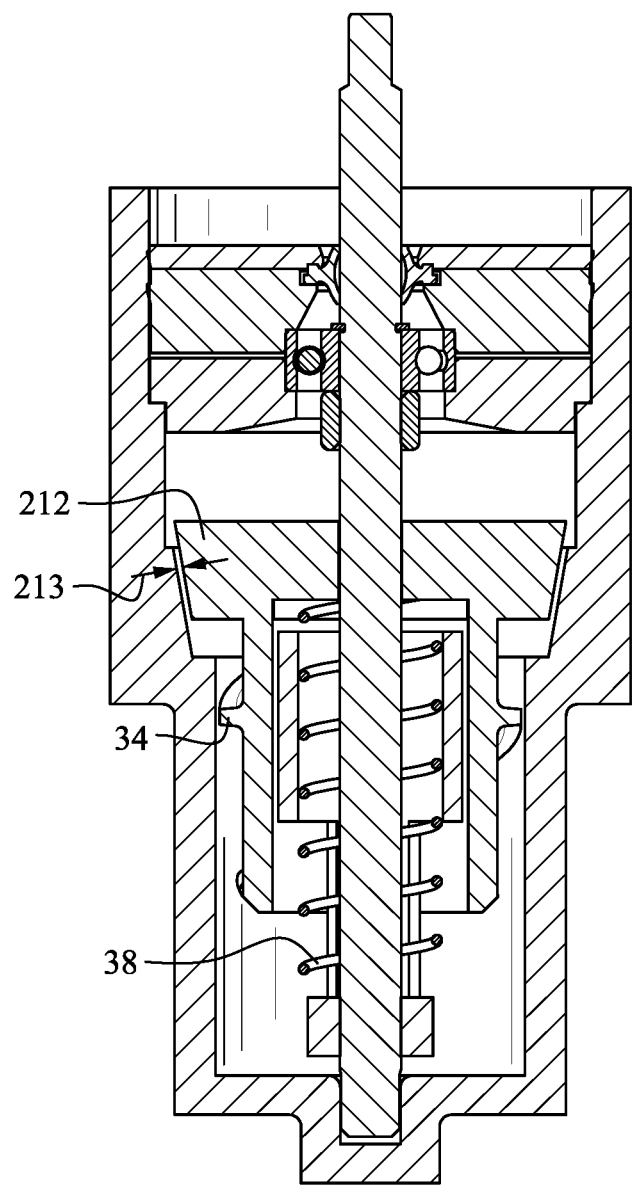
FIG. 8 is a sectional view of the FIG. 7 embodiment with the rotor transitioning from a low-braking position to a high-braking position.

FIGS. 7 and 8 show an alternative design for varying the shear and braking based on the axial position of the rotor 212. In this embodiment, the braking portion 232 of the rotor 212 is part conical-shaped, and the low-clearance section B in the housing 16 is correspondingly conical-shaped. FIG. 7 shows the rotor 212 in the low-shear/low-braking position, and FIG. 8 shows the rotor 212 at least partially in the high-shear/high-braking position. Note that the shear gap 213 gets smaller as the axial position of the rotor 212 is displaced against a force of the spring 38 by the impeller 34 due to increased rotation speeds.

Figure 9:
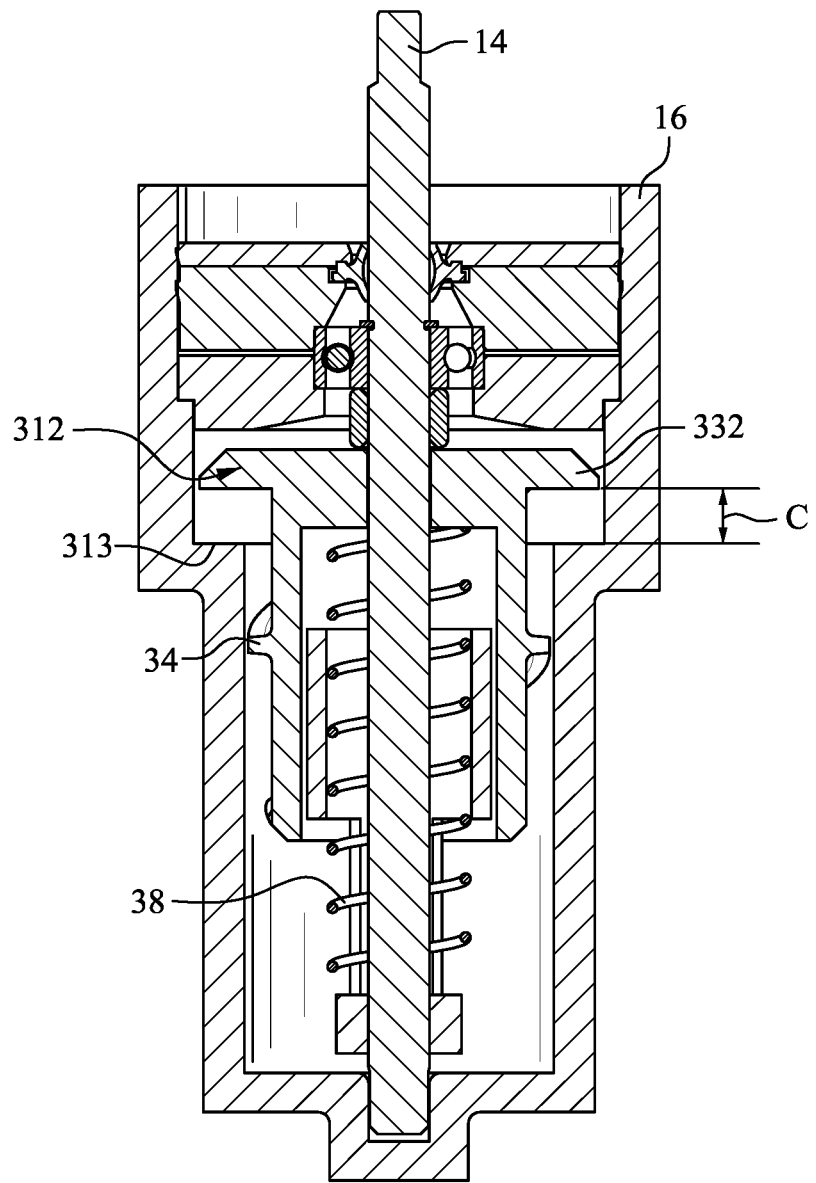
FIG. 9 is a sectional view of an alternative embodiment utilizing a disk-shaped rotor.
Figure 10:
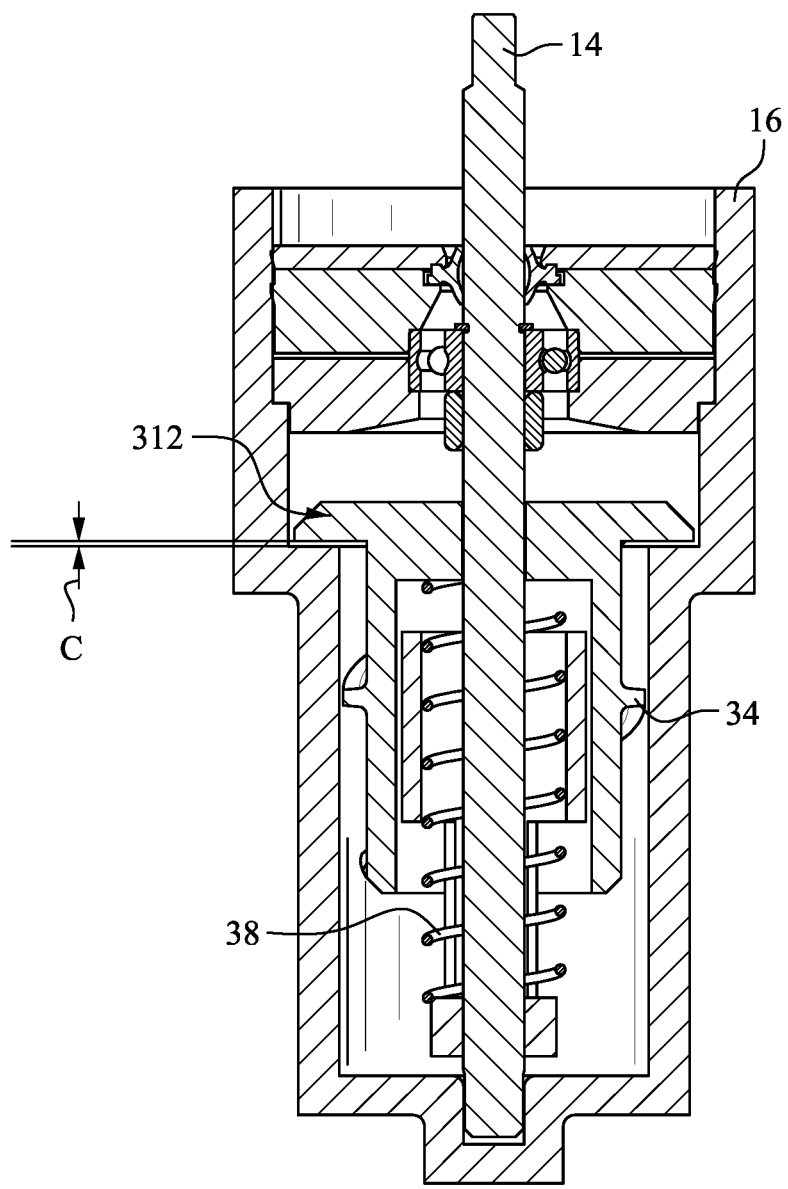
FIG. 10 is a sectional view of the embodiment in FIG. 9 in a high-braking position.

FIGS. 9 and 10 show yet another alternative embodiment where the housing includes a shoulder 313, and the braking portion 332 of the rotor 312 is spaced from the shoulder 312 by a variable shear gap C. As the axial position of the rotor 312 is driven by the impeller 34, the shear gap C is reduced as shown in FIG. 10 for higher shear and higher braking.

Figure 11:
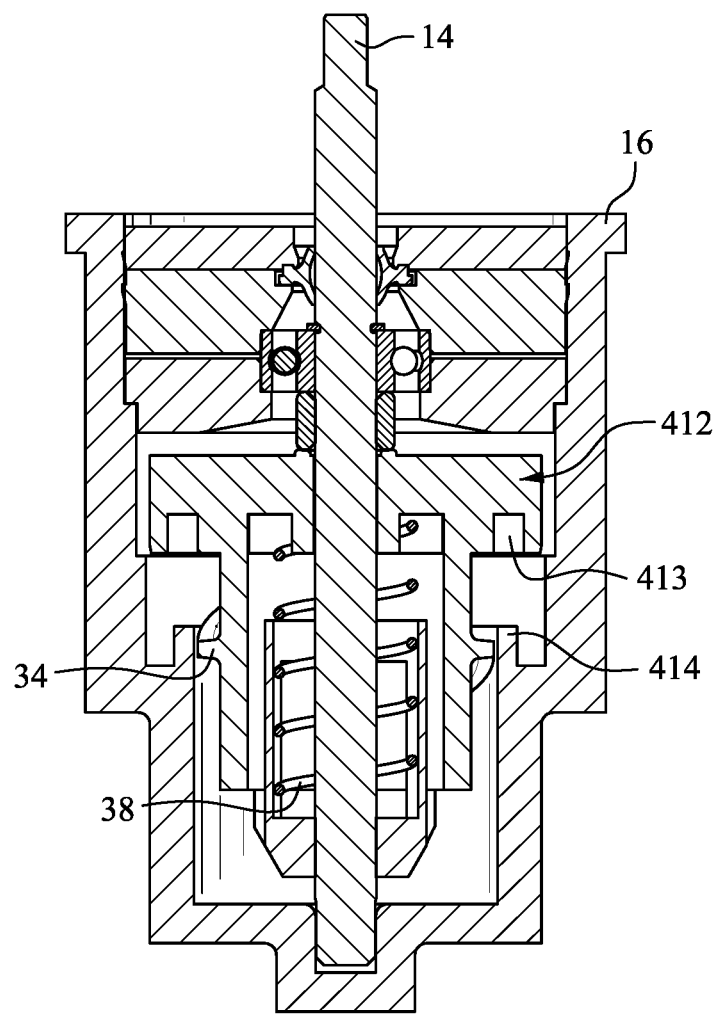
FIG. 11 is a sectional view of an alternative embodiment showing a 3-stage device with added sheer area in the minimum braking position.
Figure 12:
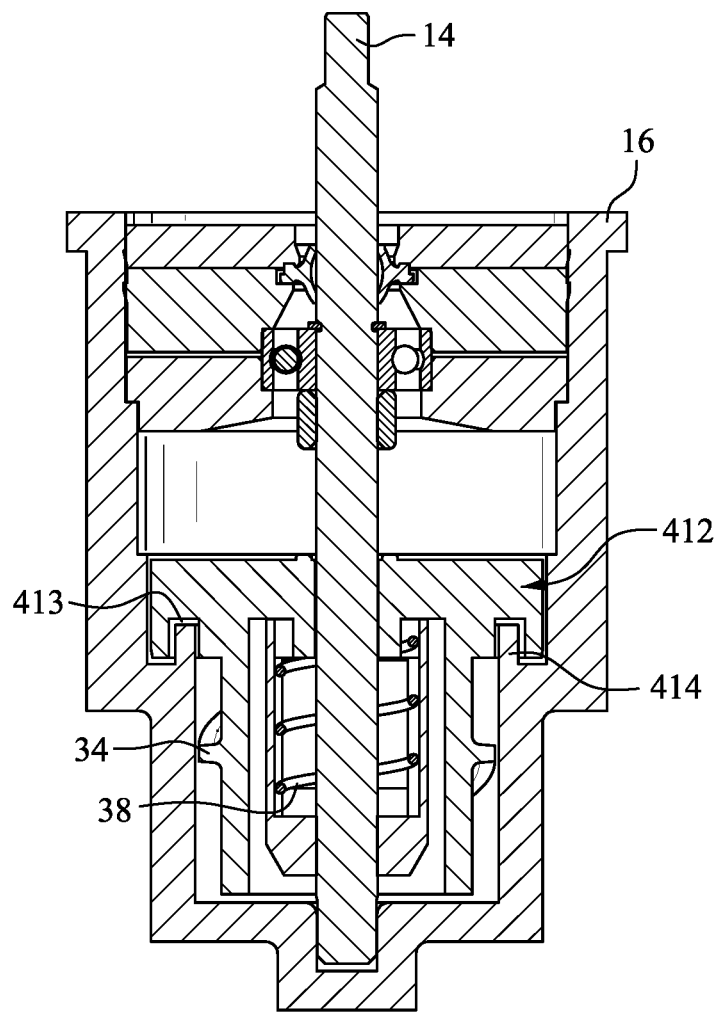
FIG. 12 is a sectional view of the FIG. 11 embodiment in a maximum braking position.
Figure 13:
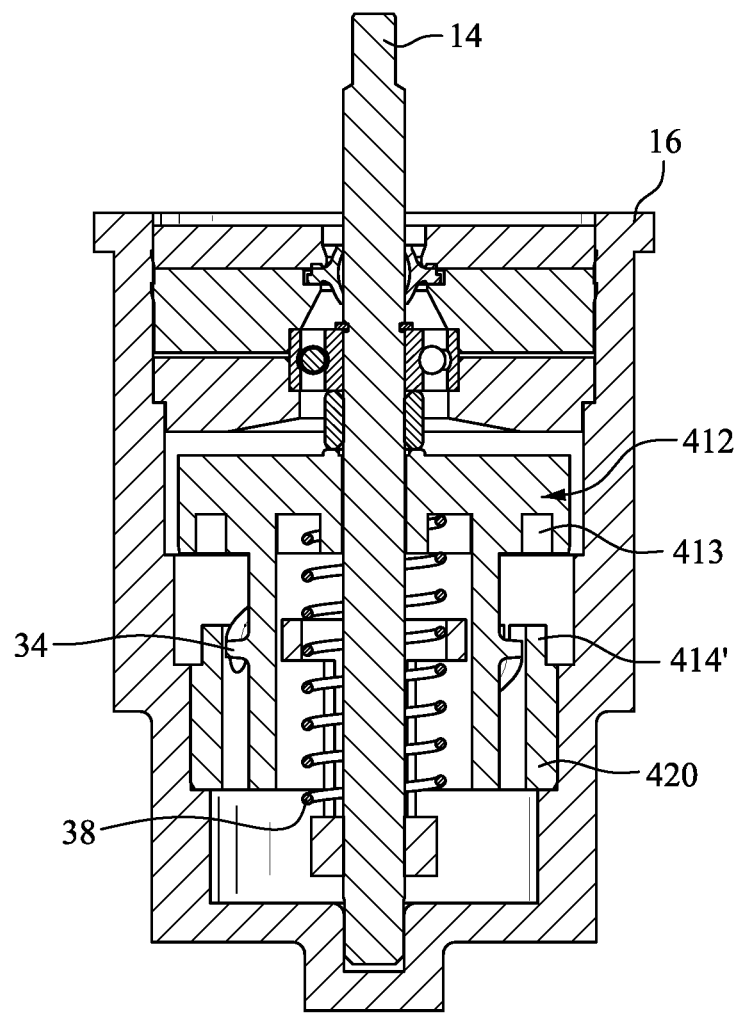
FIG. 13 is a sectional view of the FIG. 11 embodiment including a drive control band.

FIGS. 11-13 show an embodiment that not only changes the shear gap, but also adds additional shear area. The rotor 412 includes a circular slot 413 that engages a standing rib or circular ridge 414 formed in the housing 16. The ridge 414 provides added shear area when engaged by the rotor 412. In FIG. 13, the ridge 414' forms parts of a drive control band 420 inserted between the housing 16 and the rotor 412. The drive control band 420 keeps the length of the screw portion/impeller 34 of the rotor 412 that is engaged in the tight diameter constant and gives better control of the rotor response.

Figure 14:
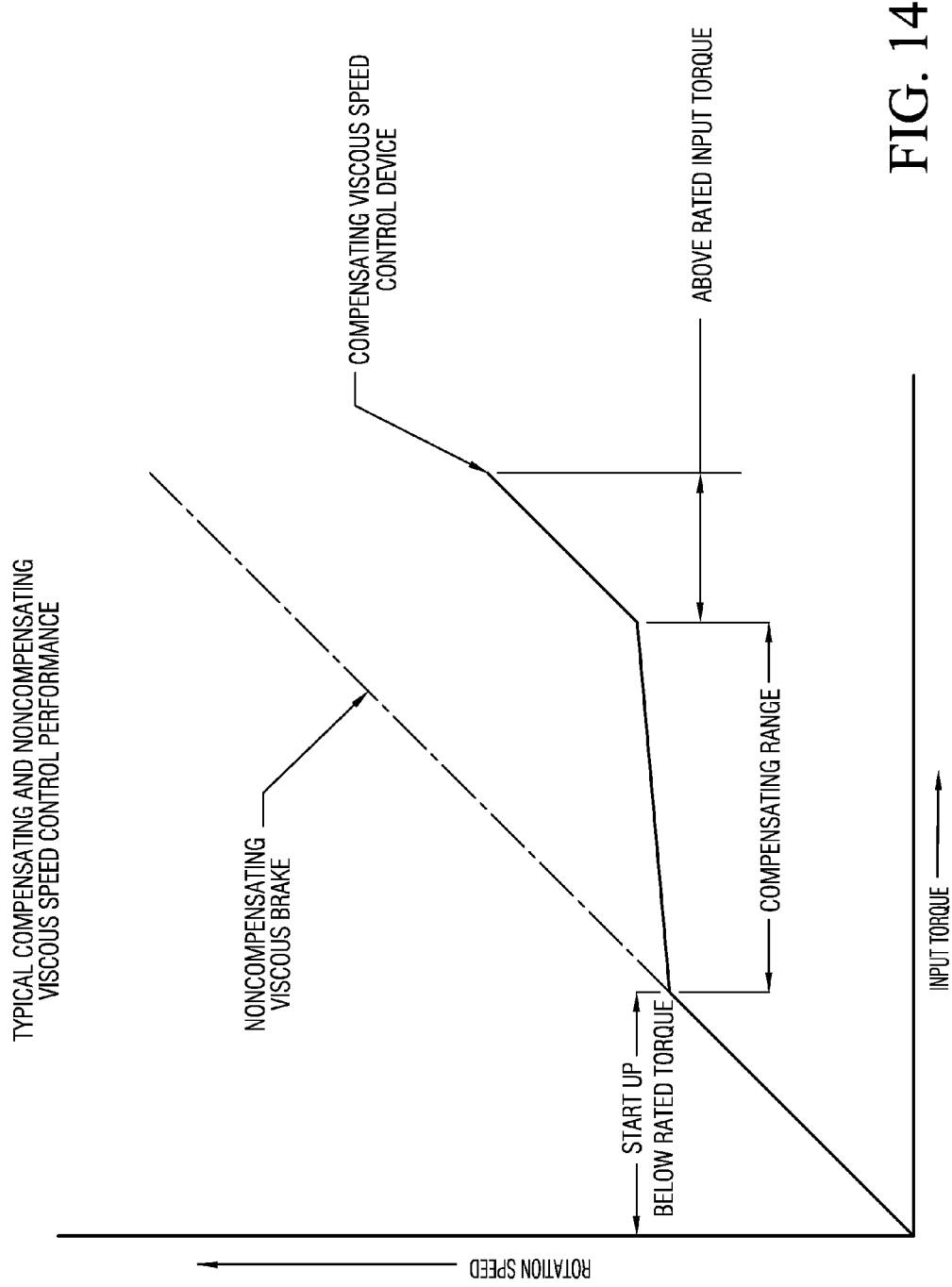
FIG. 14 is a graph showing typical compensating and noncompensating viscous speed control performance.

FIG. 14 is a typical performance graph that illustrates the performance difference between a conventional viscous brake and this device.

Figure 15:
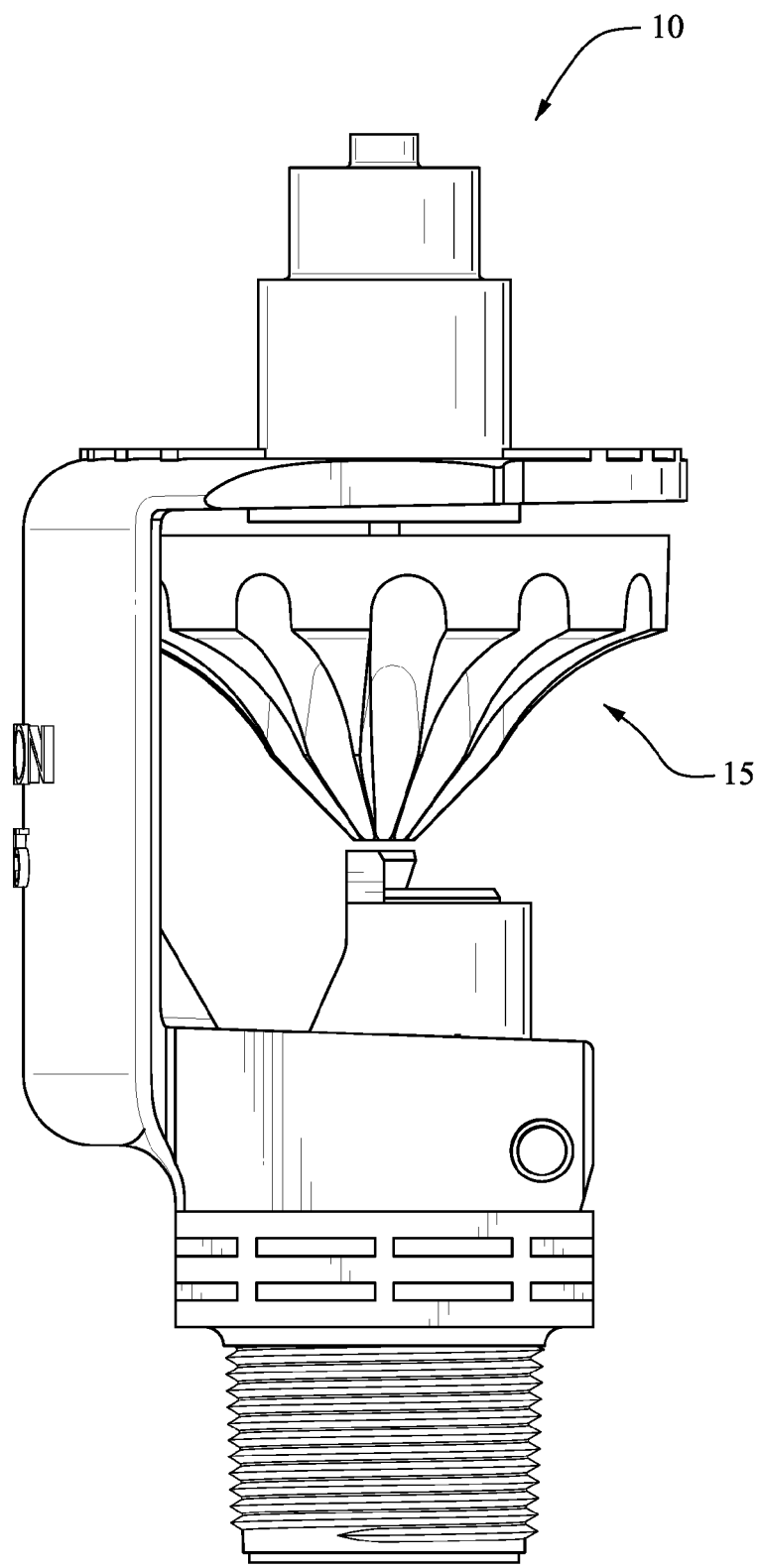
FIGS. 15 and 16 show the rotational speed control device as part of an industrial sprinkler.
Figure 16:
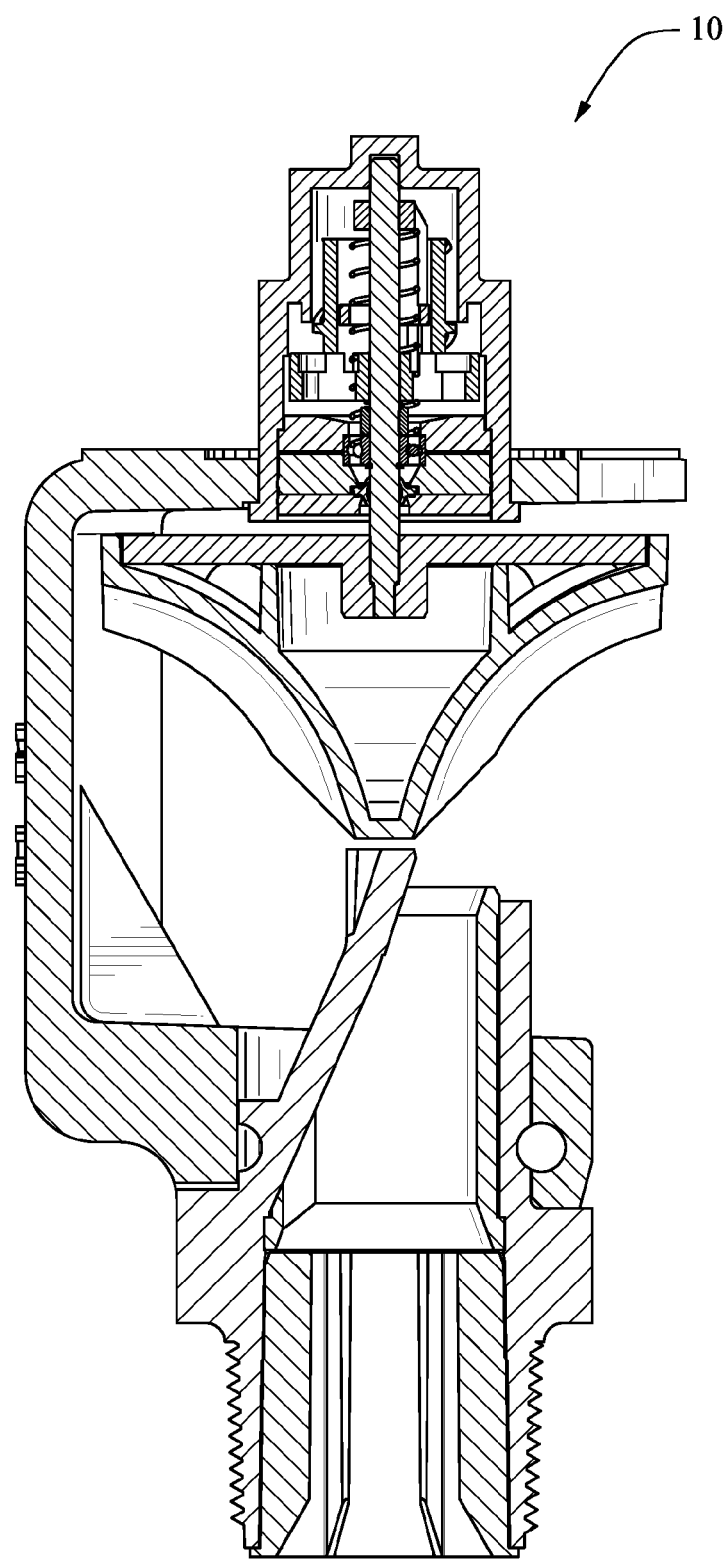

FIGS. 15 and 16 show the device 10 as part of a sprinkler. Note that the device 10 may also be employed in other forms of sprinklers including ones that would transmit torque to the device shaft via a gear train.

Figure 17:
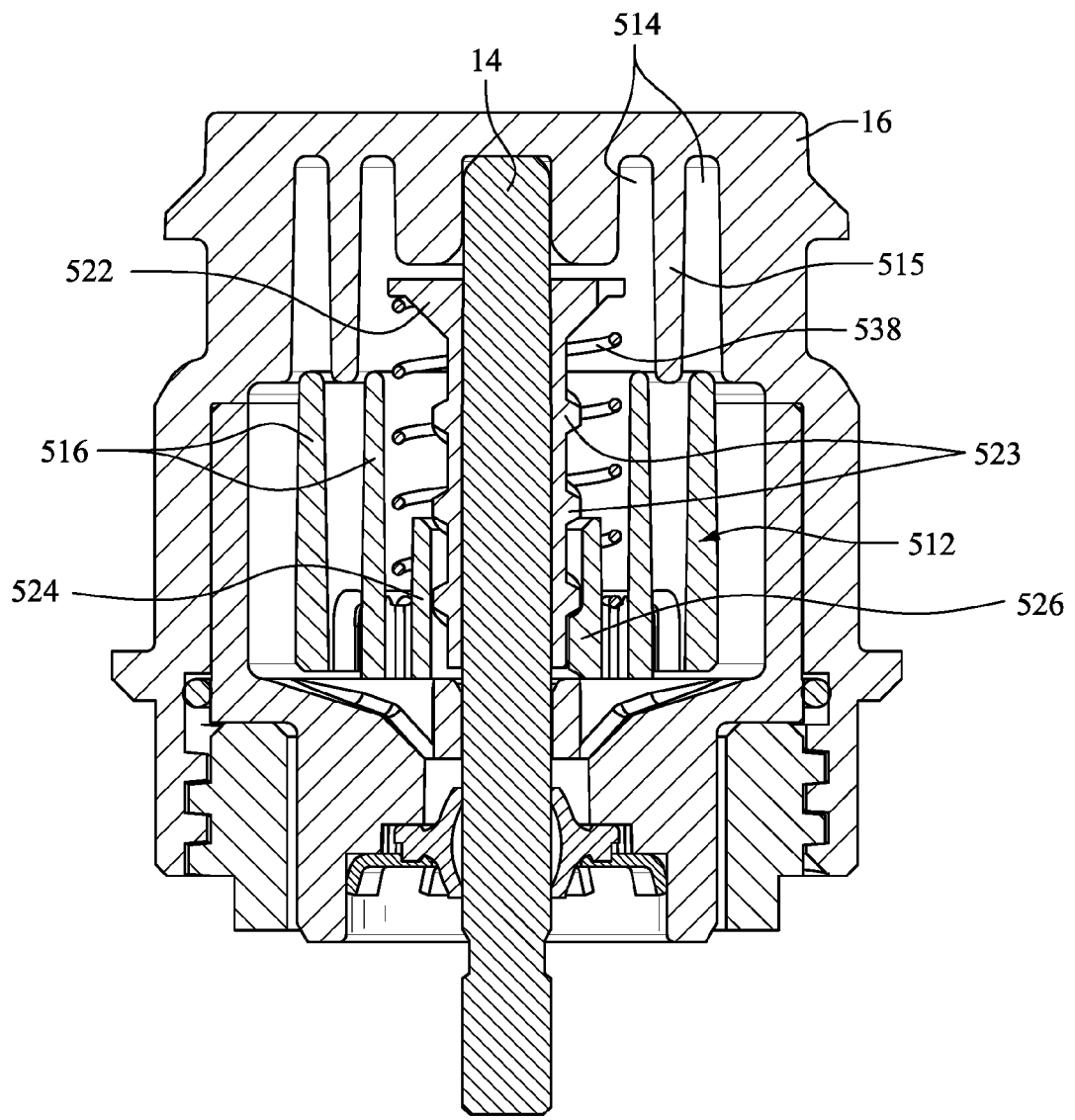
FIG. 17 is a sectional view of an alternative embodiment utilizing nested cylinders.

FIG. 17 shows another alternative configuration where the housing 16 containing the viscous fluid is provided with a plurality of circular grooves 514 separated by a cylindrical ridge 515. The rotor 512 includes separated cylinders 516 that are cooperable with the grooves 514 to increase or decrease the shear and braking based on an axial position of the rotor 512. A threaded hub 522 including hub threads 523 is press fit to the shaft 14 so that it will rotate with the shaft. In this embodiment, the rotor also includes a central cylinder 524 including a thread segment 526.

The central cylinder 524 and the thread segment 526 frictionally engage the hub 522 and hub threads 523. As it begins to rotate, the rotor 512 also rotates with the threaded hub 522. As input torque increases, the rotation speed of the shaft 14 and rotor 512 increases, which creates more torque on the rotor 512 due to the increase in shearing of the fluid between the cylinder rings 516 and the interior wall of the housing 16. This increase in torque causes the rotor 512 to overcome the frictional engagement force and rotate relative to the hub 522, which threads (spirals) the rotor 512 up the hub 522 against the bias of the spring 538. There may be some slippage between the end of the spring 538 and the rotor 512 and/or the hub 522 to allow the rotor 512 to rotate relative to the hub 522. When the input torque is reduced, the speed slows, and the torque on the rotor 512 due to shearing of the fluid is therefore reduced. As a consequence, the spring 538 can overpower the upward forces and cause the rotor 512 to thread (spiral) down the hub 522 until equilibrium is reached.

Figure 18:
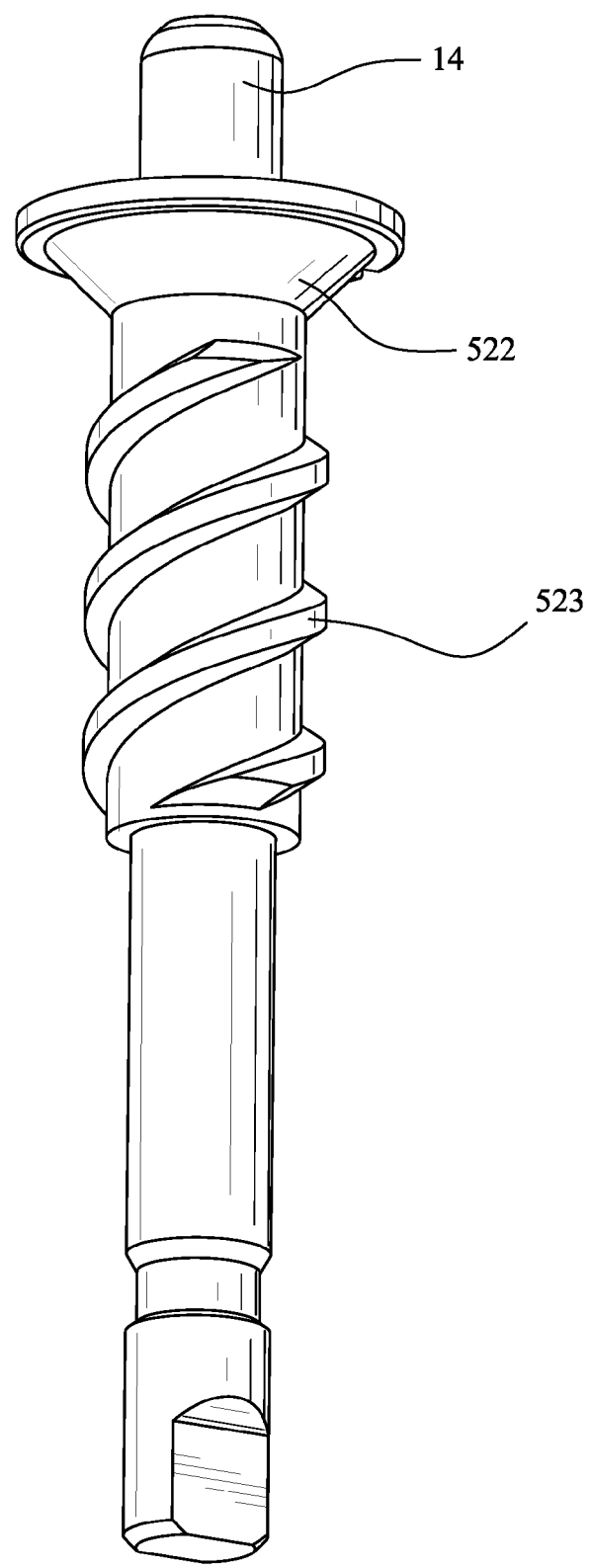
FIG. 18 shows the shaft and a threaded hub for the FIG. 17 embodiment.
Figure 19:
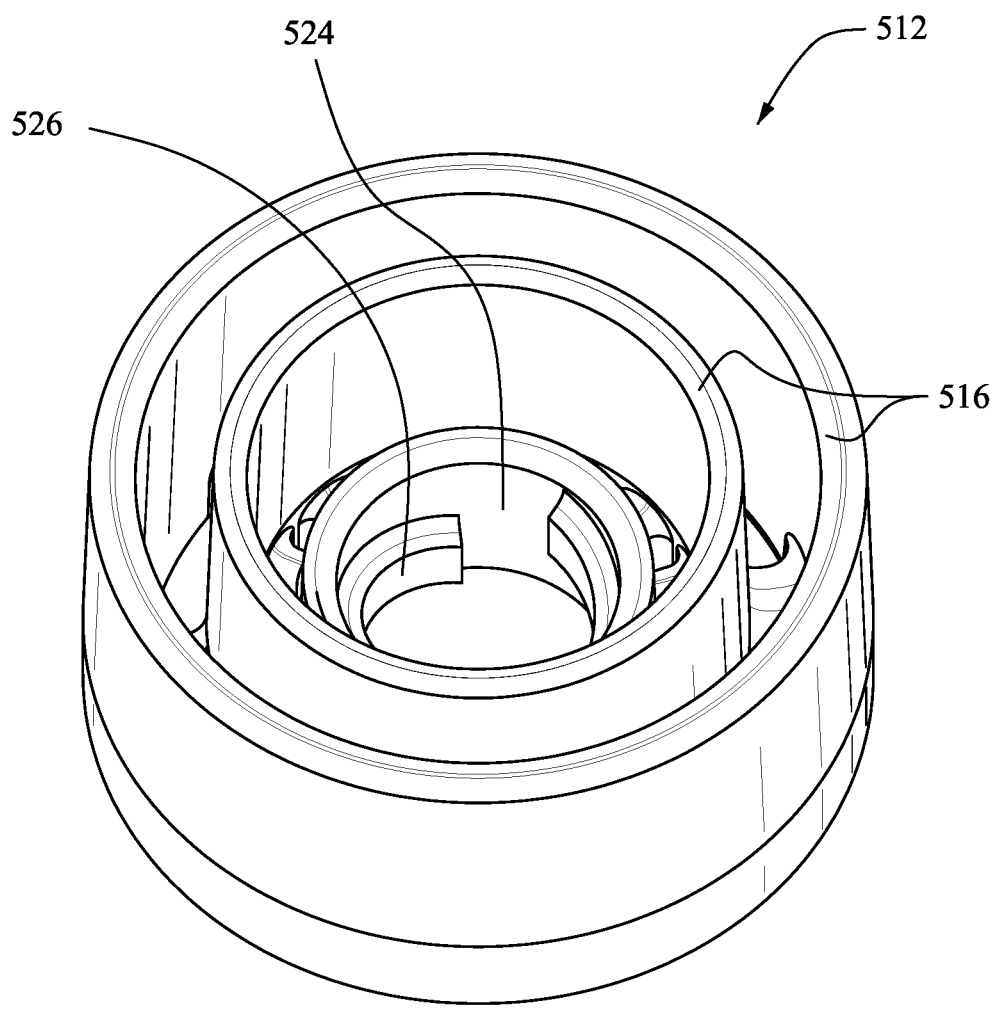
FIG. 19 is a detailed view of the rotor for the FIG. 17 embodiment.
Figure 20:
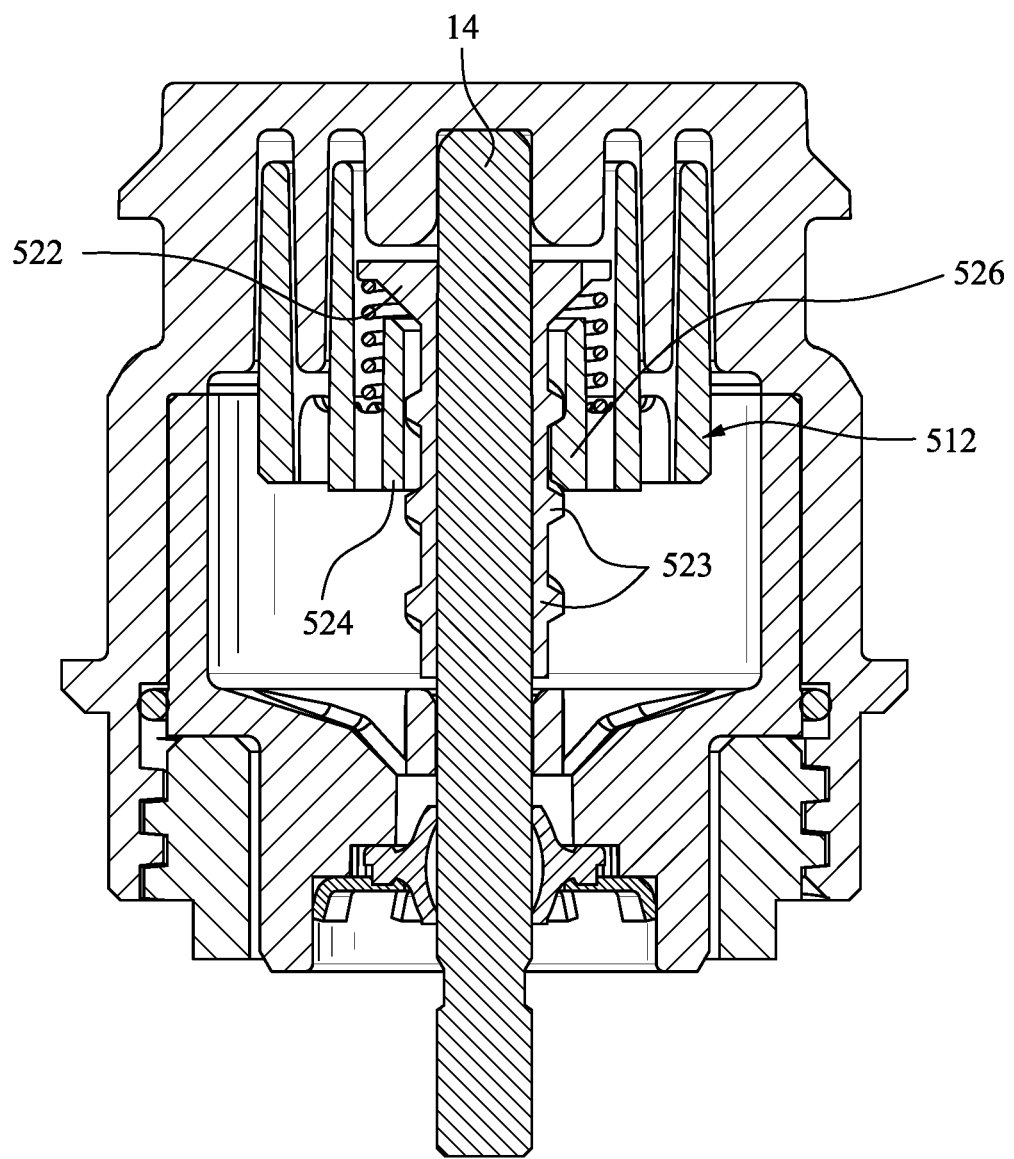
FIG. 20 shows the rotor in the FIG. 17 embodiment approaching a maximum torque position.

When the rotor 512 is in the maximum torque position (see FIG. 20), a chamfered surface on the end of the rotor central cylinder 524 contacts the conical surface near the top of the hub 522 (preventing further upward movement of the rotor 512), and the hub 522 and rotor 512 subsequently rotate together as the hub 522 continues to rotate, until such time that there is a drop in input torque. If there is no drop in input torque, and if input torque continues to increase, the rotation speed will continue to increase. FIG. 18 is an isolated view of the threaded hub 522 and the shaft 14. FIG. 19 is an isolated view of the rotor 512. FIG. 20 shows the rotor 512 displaced axially from the position shown in FIG. 17 and approaching the maximum torque position.

FIGS. 21-28 show two further embodiments for viscous fluid compensating brakes. Like prior embodiments, both units are filled with a high-viscosity silicone fluid or the like. Both designs utilize a shaft that turns components that have radially expanding members. The radially expanding members expand in response to rotation speed to increase the braking torque by decreasing the viscous fluid shear gap. In the embodiment of FIGS. 21-24, the device is shown with a smooth outside diameter on the brake shoes 614 that interacts with a smooth inside wall or inside diameter on the housing 16. The embodiment shown in FIGS. 25-28 utilizes labyrinth-type geometry in the area of interaction, but smooth or labyrinth could be used with both concepts.

Figure 21:
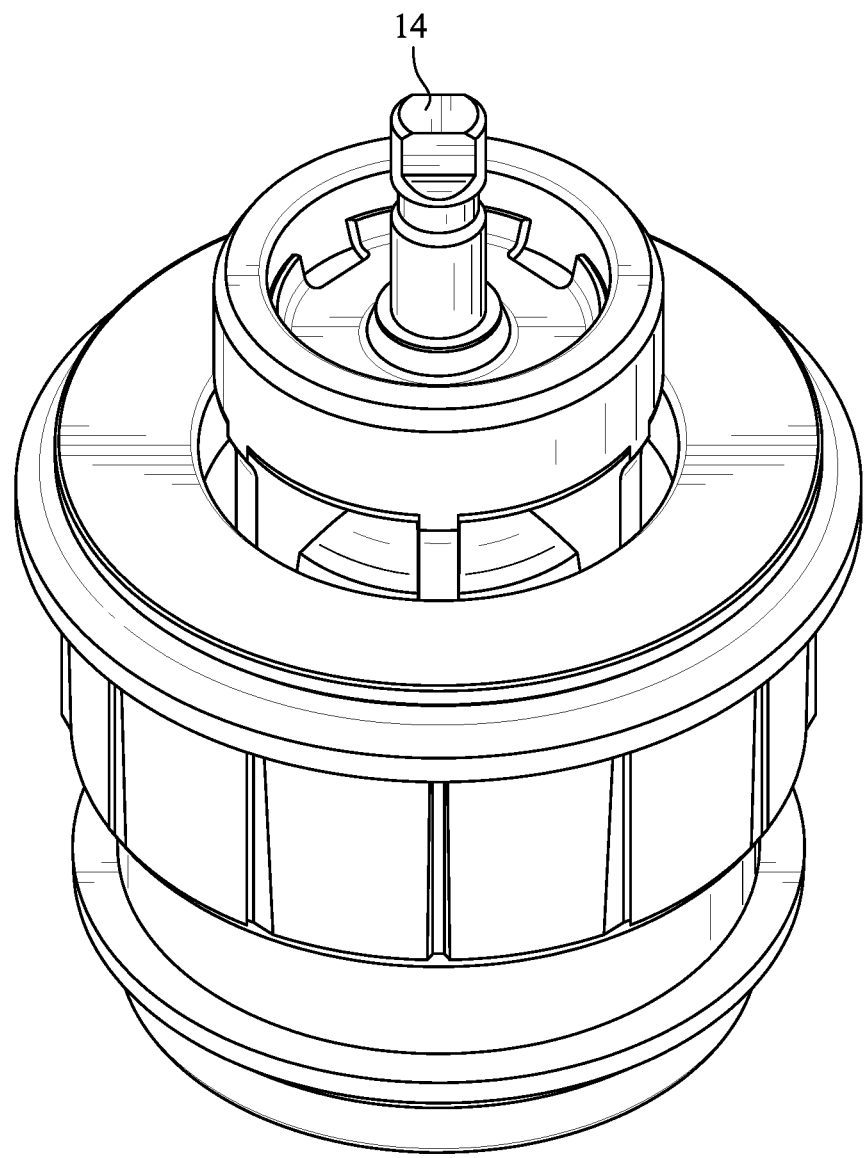
FIG. 21 is an upper perspective view of the brake assembly of an alternative embodiment.
Figure 22:
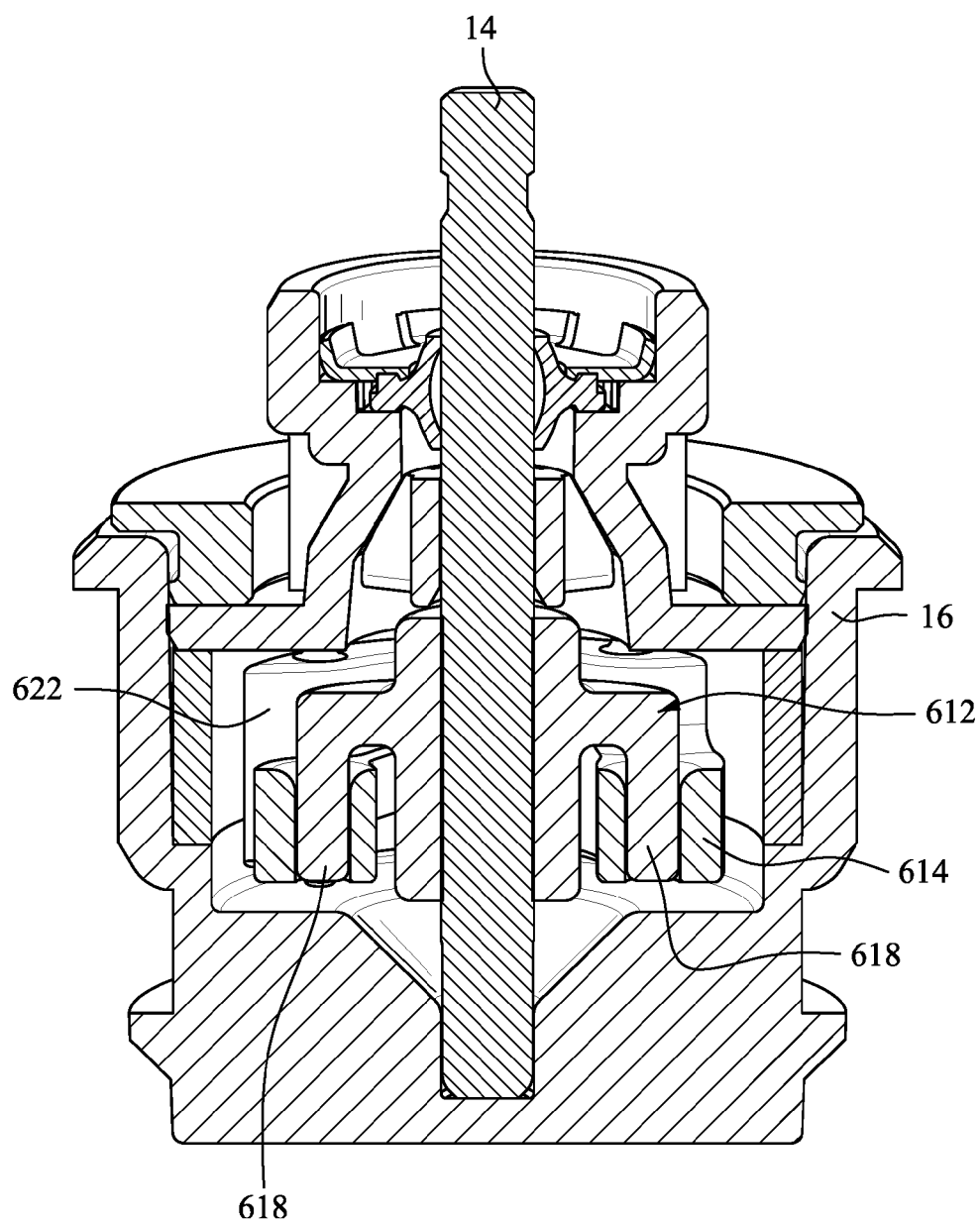
FIG. 22 is a vertical section view of FIG. 21 showing the hub and brake shoes.
Figure 23:
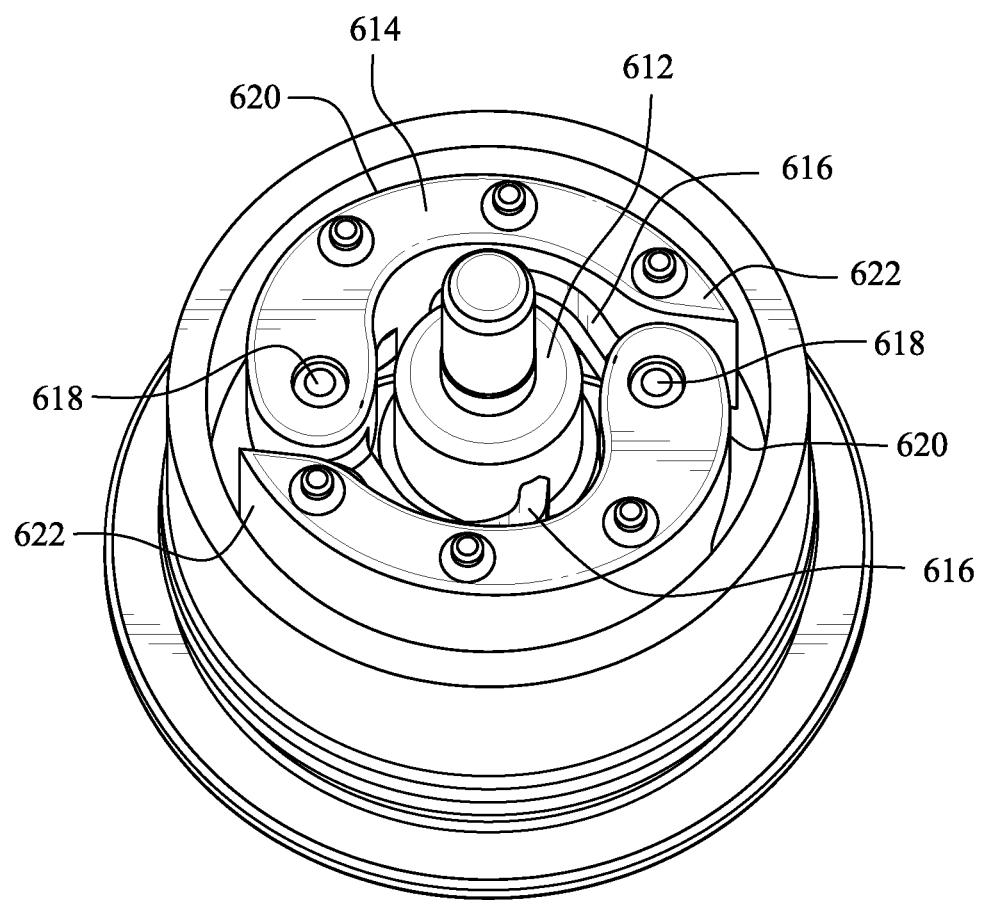
FIGS. 23 and 24 show a lower view of the FIG. 21 assembly with the housing removed.
Figure 24:
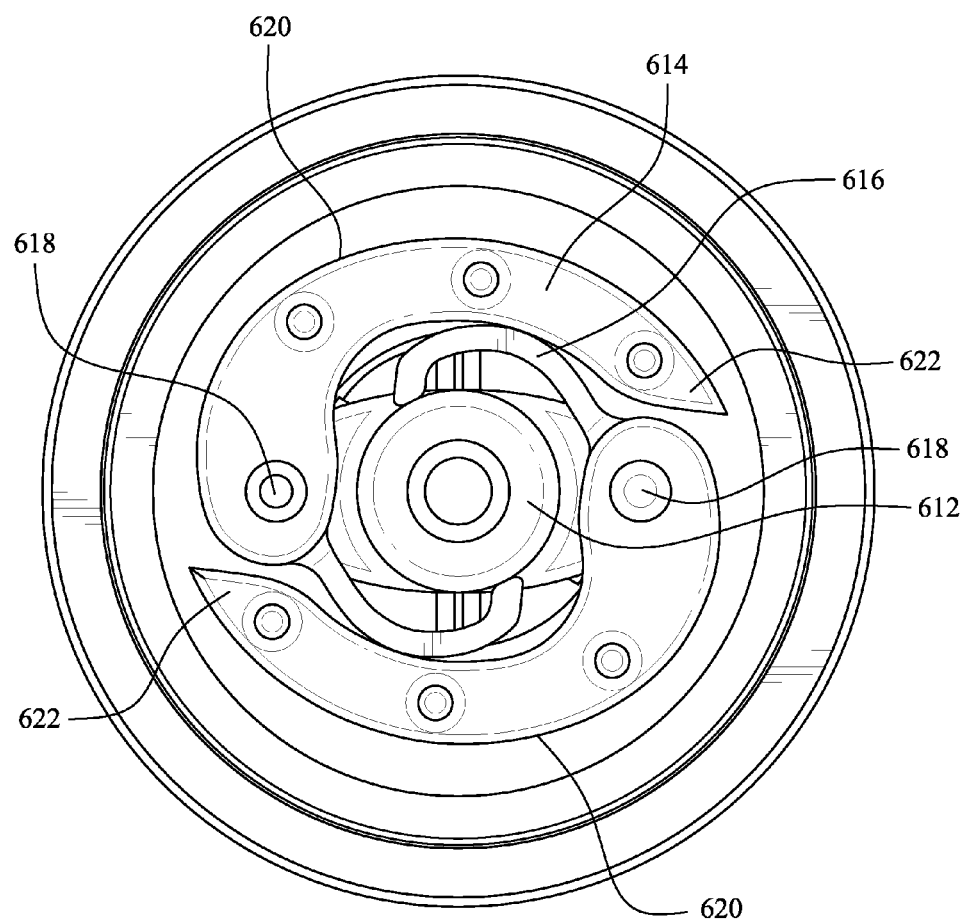

FIG. 21 is an upper perspective view of the brake assembly alone. FIG. 22 is a vertical section view of FIG. 21 showing the hub 612 and brake shoes 614. FIGS. 23 and 24 show a lower view of the assembly with the housing removed. The brake shoes 614 are in the minimum torque position, being biased there by integral springs 616. The hub 612 is secured to the shaft 14 for rotation with the shaft 14. The hub 612 includes pivot posts 618 about which the brake shoes 614 are pivotable, respectively. The brake shoes 614 include exterior surfaces 620 that are curved substantially corresponding to the inside wall of the housing 16. As the brake shoes 614 pivot on the pivot posts 618, the curved exterior surfaces 620 of the brake shoes 614 are displaced radially outward toward the inside wall of the housing 16. An amount of pivot/displacement of the brake shoes 614 varies according to a rotation speed of the shaft 14.

The minimum torque position shown is the position of the shoes 614 when the unit is at rest or when turning very slowly. The leading edges 622 of the shoes are shaped such that as rotation speed increases, the shoes 614 will pivot outward against the force of the spring 616 to decrease the fluid shear gap on the outside of the shoes 614, thereby increasing the braking torque. That is, the brake shoes 614 are pivoted radially outward by rotation of the shaft 14 by an amount that varies according to the rotation speed of the shaft 14. In one arrangement, the leading edges 622 of the brake shoes 614 are tapered, although other shapes may be suitable. The shoes 614 may be configured to press against the inside wall of the housing 16 to add a mechanical friction component to the braking torque.

Figure 25:
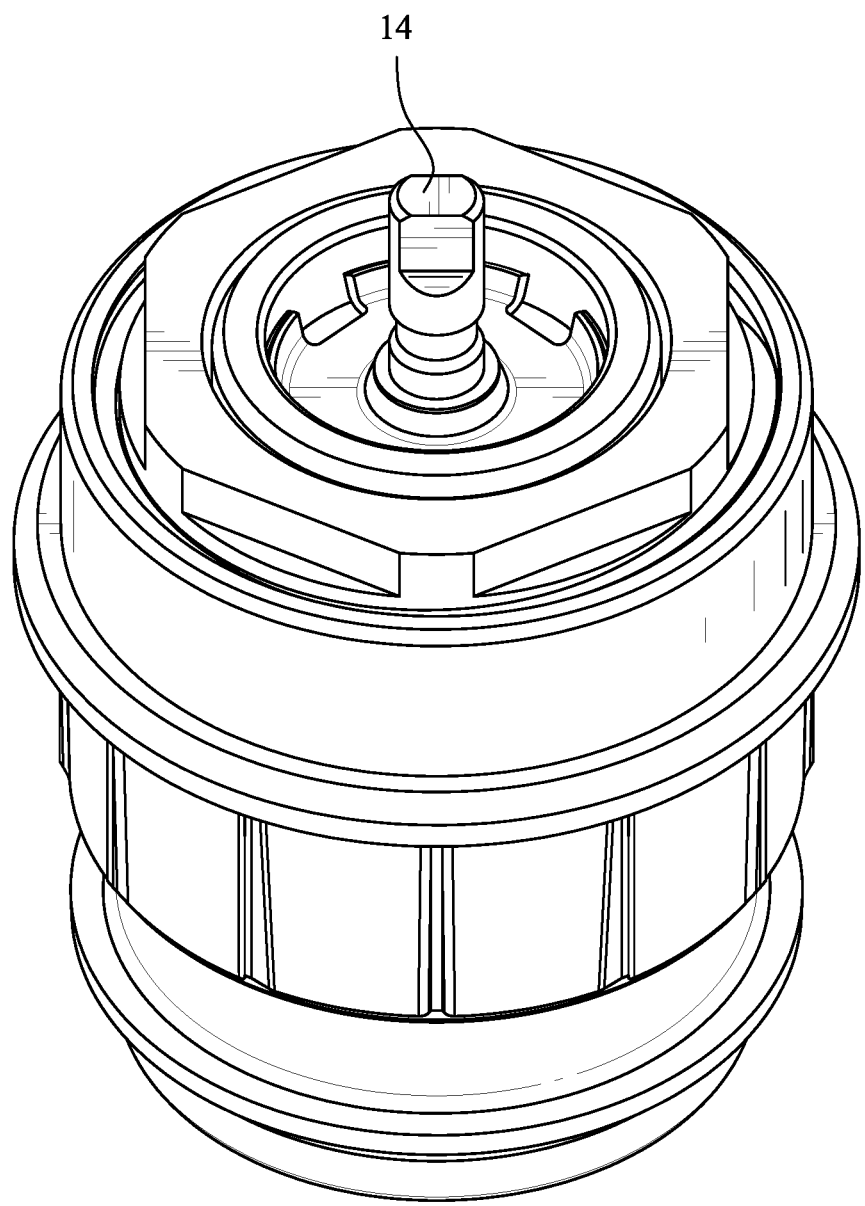
FIG. 25 is an upper perspective view of an alternative brake assembly.
Figure 26:
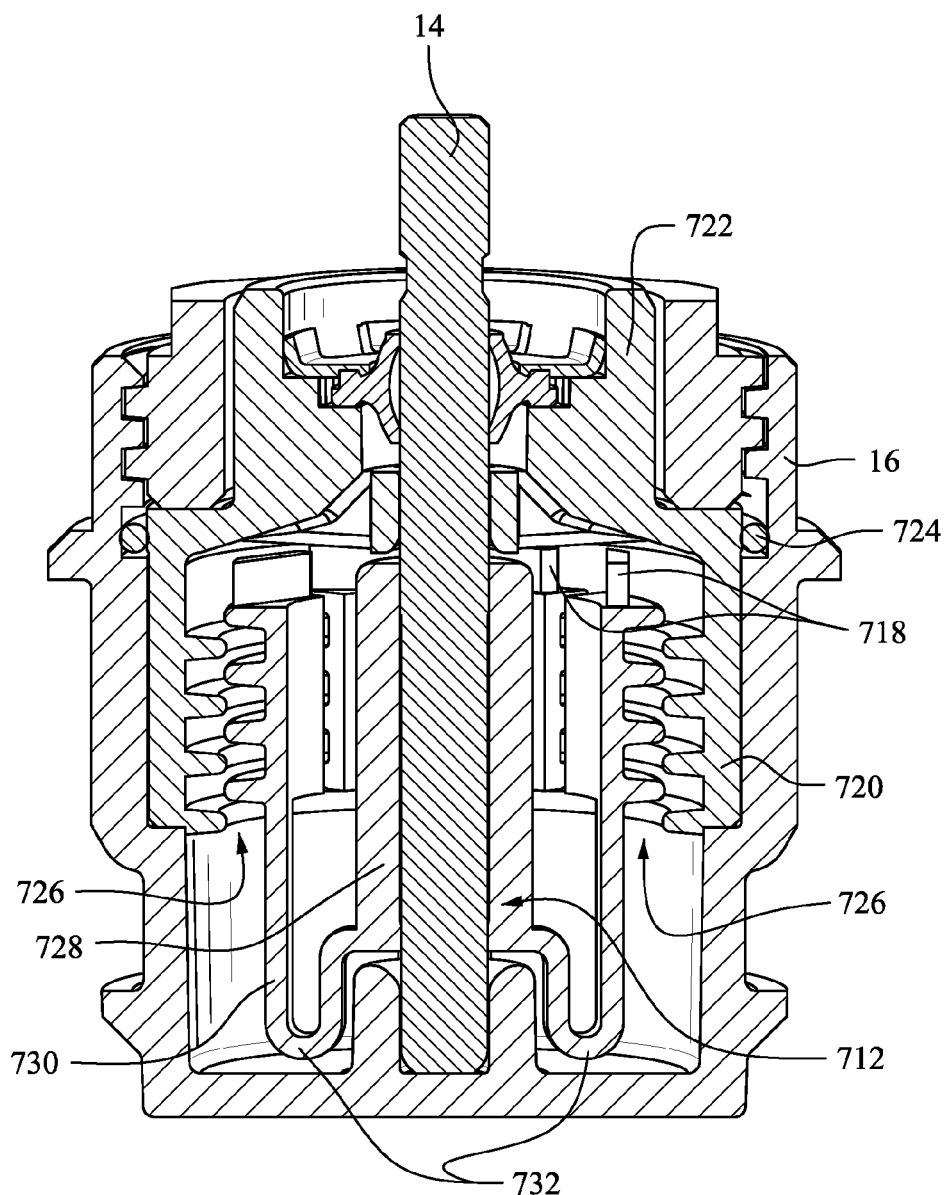
FIGS. 26 and 27 are sectional views of the FIG. 25 embodiment.
Figure 27:
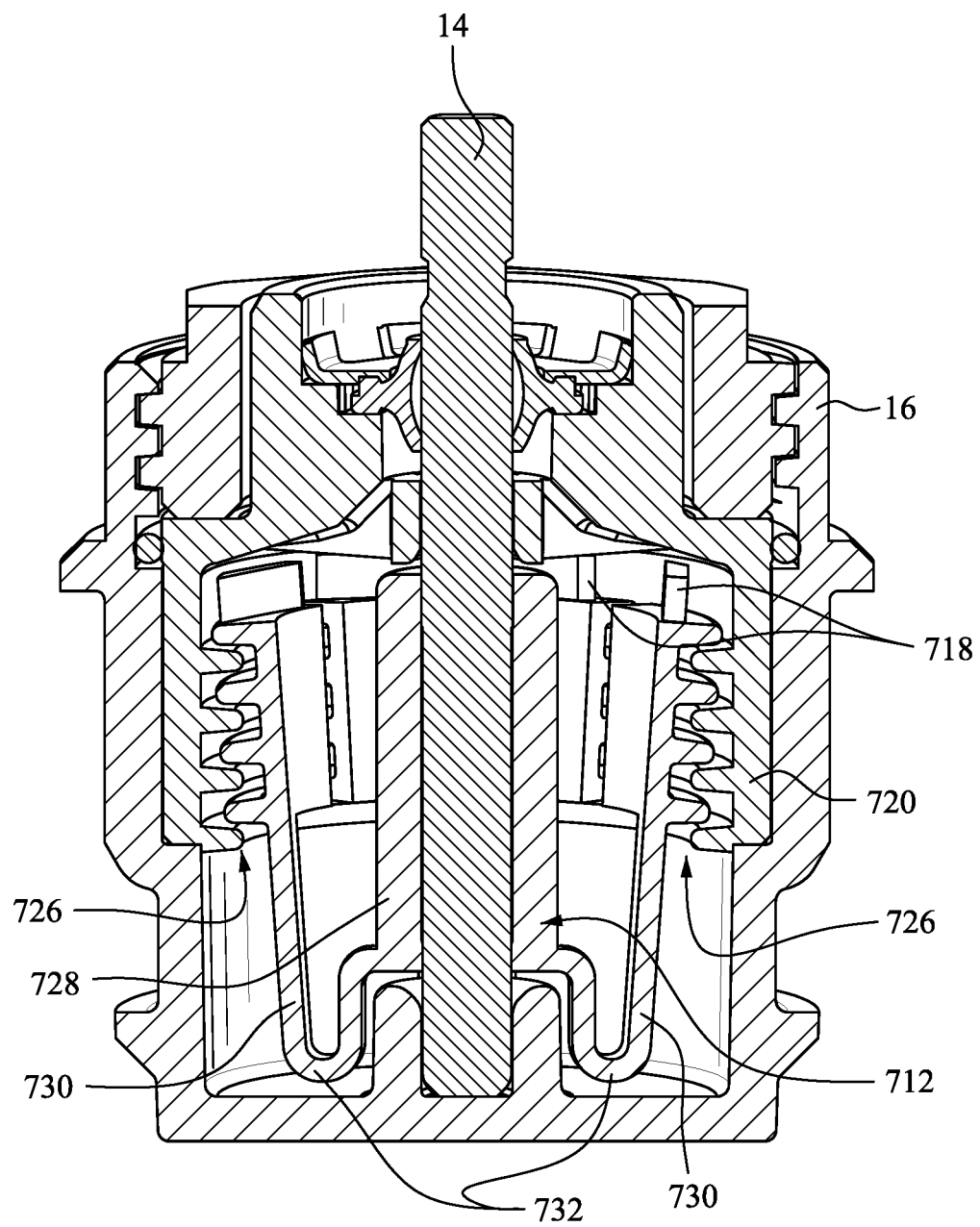

FIG. 25 is an upper perspective view of an alternative brake assembly alone. FIGS. 26 and 27 are vertical section views. The housing 16 may be provided with labyrinth rings 720 on the inside wall. The rings 720 may be machined or molded with the housing 16, or the rings 720 may be in the form of an insert 722 secured in the housing 16. As shown in FIG. 26, a seal 724 such as an O-ring or the like seals a joint between the housing 16 and the insert 722.

In this embodiment, the radially expanding member may include labyrinth segments 726 that are displaceable between a contracted position (FIG. 26) and an expanded position (FIG. 27). The segments 726 are sized and positioned to interact with the labyrinth rings 720 in the expanded position. The radially expanding member also includes a rotor section 728 that is fixed to the shaft 14 and segment arms 730 coupled with the rotor section 728. As shown, the labyrinth segments 726 are disposed on outside surfaces of the segment arms 730. A spring section 732 acts between the rotor section 728 and segment arms 730 and biases the segment arms 730 toward the contracted position.

In one arrangement, the rotor section, the spring section and the segment arms may be integral with one another.

In FIG. 26, the rotor 712 is in the minimum torque position (at rest or at low speed), and in FIG. 27, the rotor 712 is nearing the maximum torque position. The rotor 712 includes a plurality of angled propeller blades 718 at the top of the rotor 712 coupled with each of the segment arms 730. As speed increases from the configuration in FIG. 26, the propeller blades 718 force the rotor segments outwardly, and the labyrinth segments 726 on the rotor 712 are interacting with the labyrinth rings 720 in the housing 16 to decrease the fluid shear gap and thereby increase the braking torque. That is, the propeller blades 718 are shaped and positioned to deflect the segment arms 730 against a force of the spring section 732 toward the expanded position by rotation of the shaft 14 by an amount that varies according to a rotation speed of the shaft 14.

Figure 28:
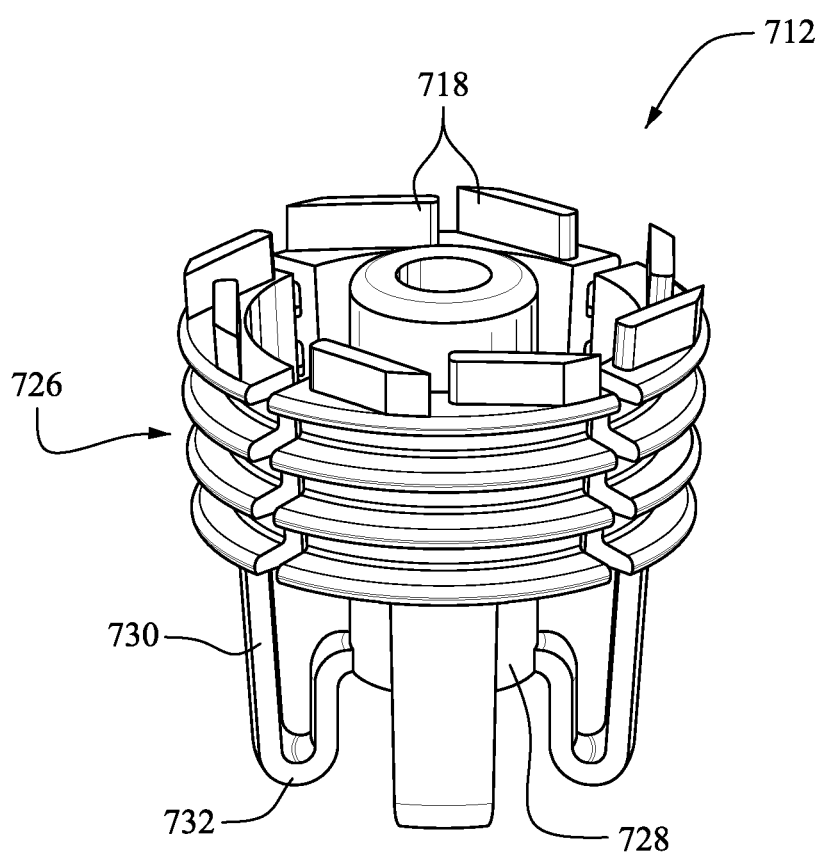
FIG. 28 is a perspective view of the rotor in the FIG. 25 embodiment.

FIG. 28 is an upper perspective view of the rotor 712 alone. The rotor 712 as shown is a single piece that may be molded out of a resilient plastic. The rotor could also be constructed as a multi-piece assembly if desired.

FIGS. 29-36 show yet another alternative configuration of the brake assembly. In principle, it is similar to the other described embodiments. Axial motion, however, is powered with propeller-type blades rather than a screw thread, and multiple concentric rings rotate in close proximity to multiple stationary rings to create the viscous-braking action.

Figure 29:
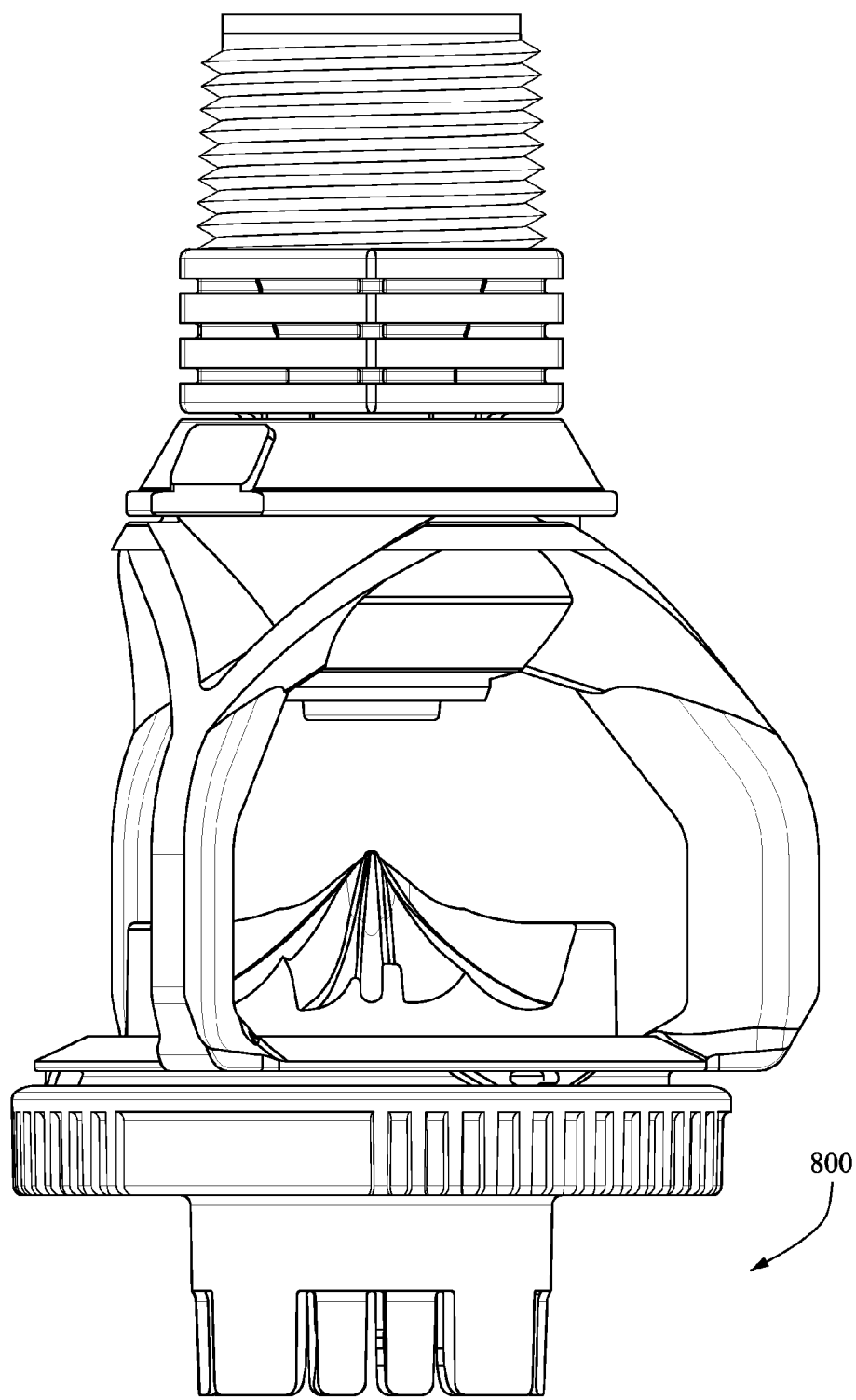
FIG. 29 is a side view of an alternative embodiment installed in an exemplary rotator sprinkler.
Figure 30:
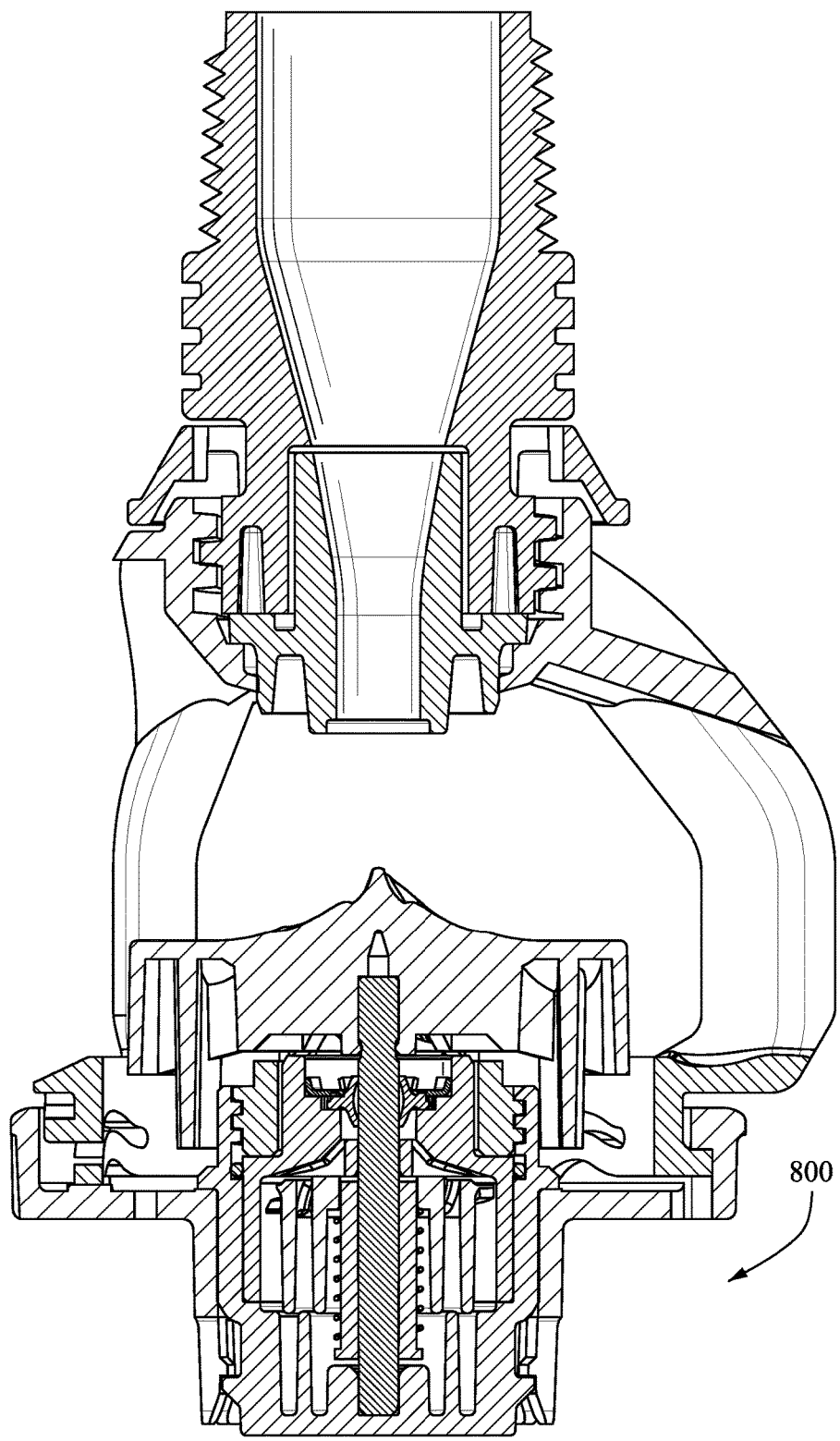
FIG. 30 is a sectional view of FIG. 29.
Figure 31:
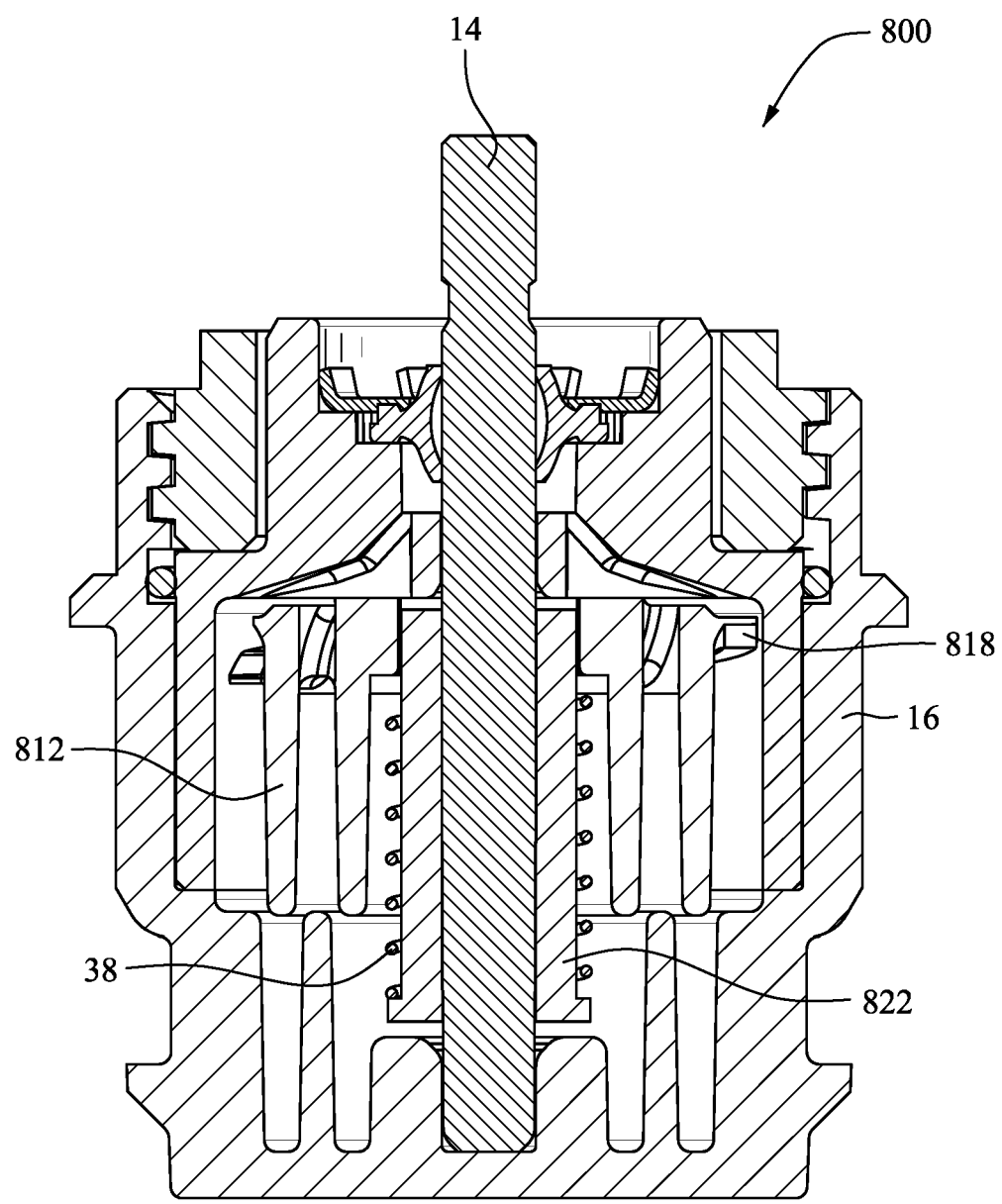
FIG. 31 is a sectional view of the brake assembly in the FIG. 29 embodiment.
Figure 32:
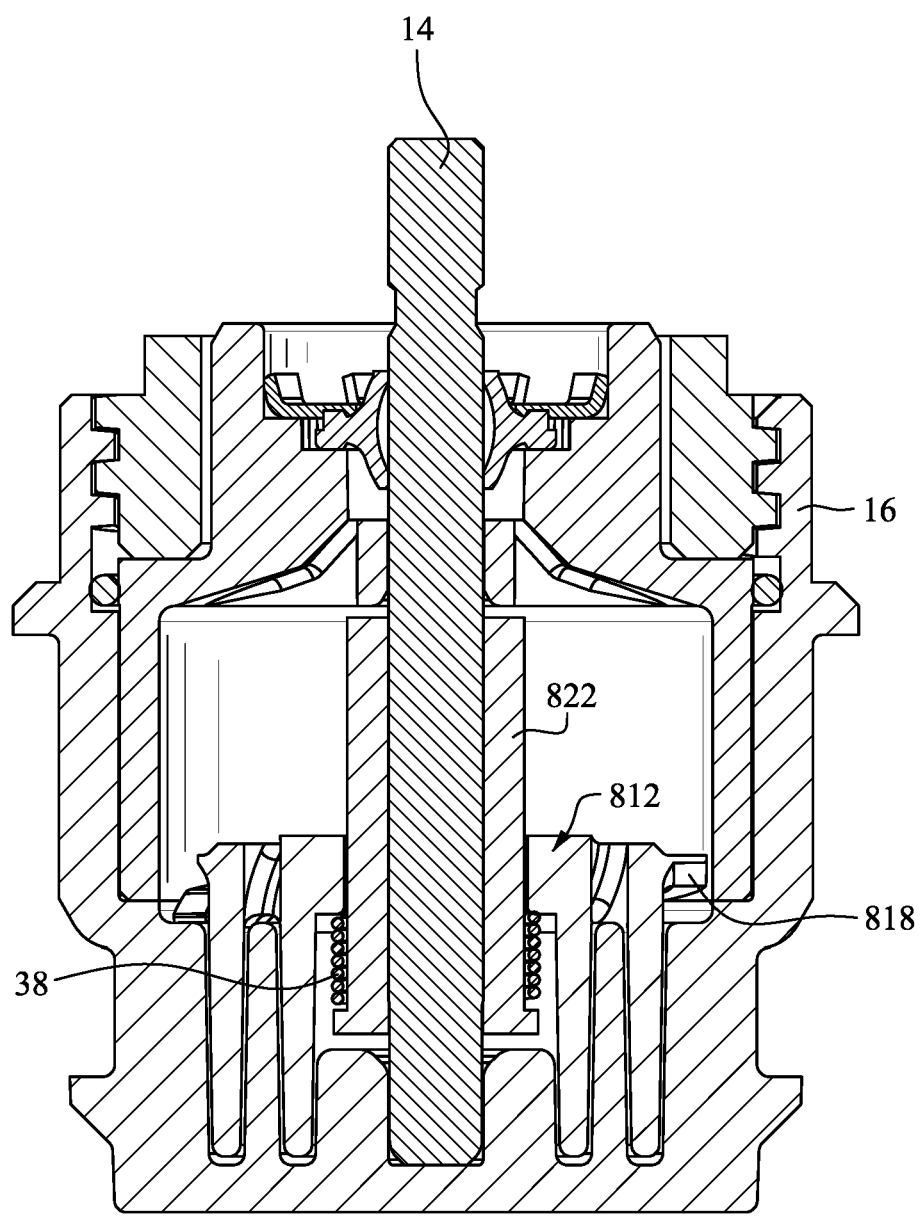
FIG. 32 is a sectional view of the FIG. 29 embodiment with the rotor in a high-braking position.

FIG. 29 is a side view of the device 800 installed in an exemplary rotator sprinkler. Typically, sprinklers operate over a wide range of nozzle sizes and line pressure. FIG. 30 is a vertical cross section of FIG. 29. FIG. 31 shows the brake assembly 800 including the housing 16, shaft 14 and rotor 812. As in previous embodiments, the housing 16 is filled with a high-viscosity silicone fluid. In FIG. 31, the brake is at rest or turning very slowly, and the rotor 812 is in the raised or low-shear position, being biased to that position by the compression spring 38. In the position shown in FIG. 31, the braking torque is at its minimum due to the relatively large clearances between the rotating and stationary members. As a torque is applied to the shaft 14, the rotor 812 turns faster, which causes outside propeller blades 818 (and to a lesser extent, the blades connecting the rotor rings) to push the rotor 812 down against the force of the spring 38. FIG. 32 shows the rotor 812 in its lowermost position, which creates maximum braking by creating large areas with minimal fluid gap. Depending on the torque applied to the shaft 14, the rotor 812 will float vertically between the minimum and maximum positions, finding an axial equilibrium between the spring load and the propeller loads.

Figure 33:
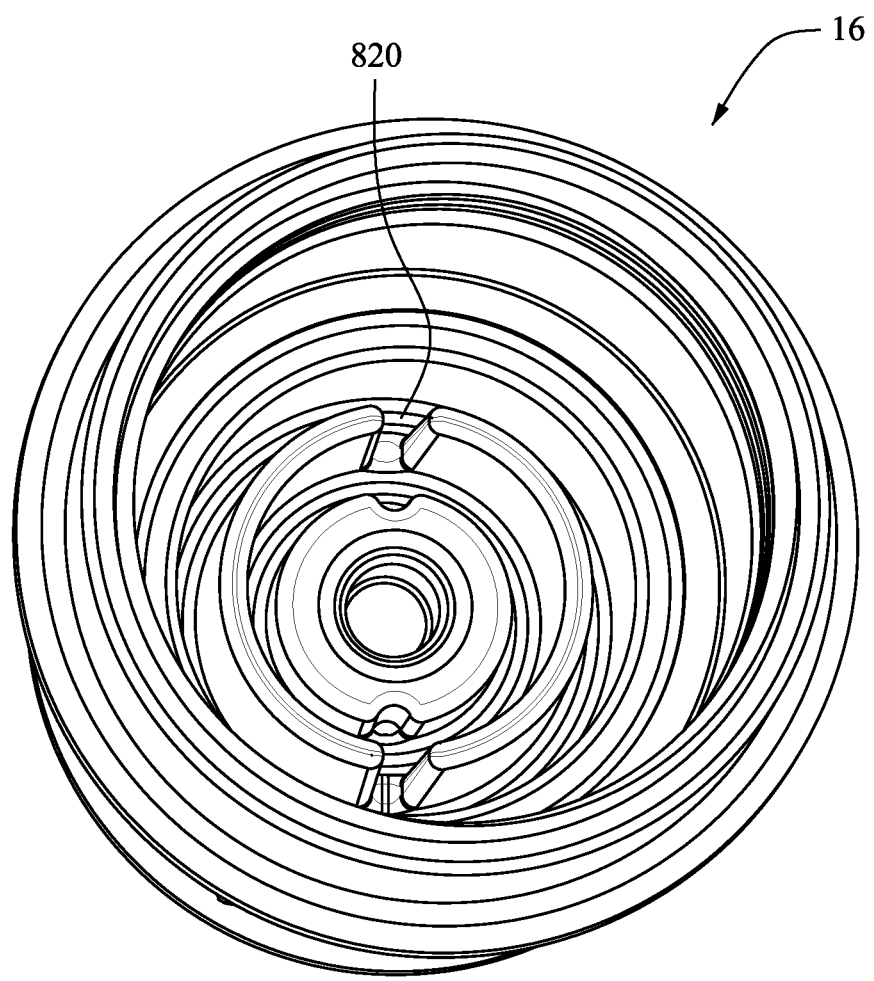
FIG. 33 is a perspective view of the housing in the FIG. 29 embodiment.
Figure 34:
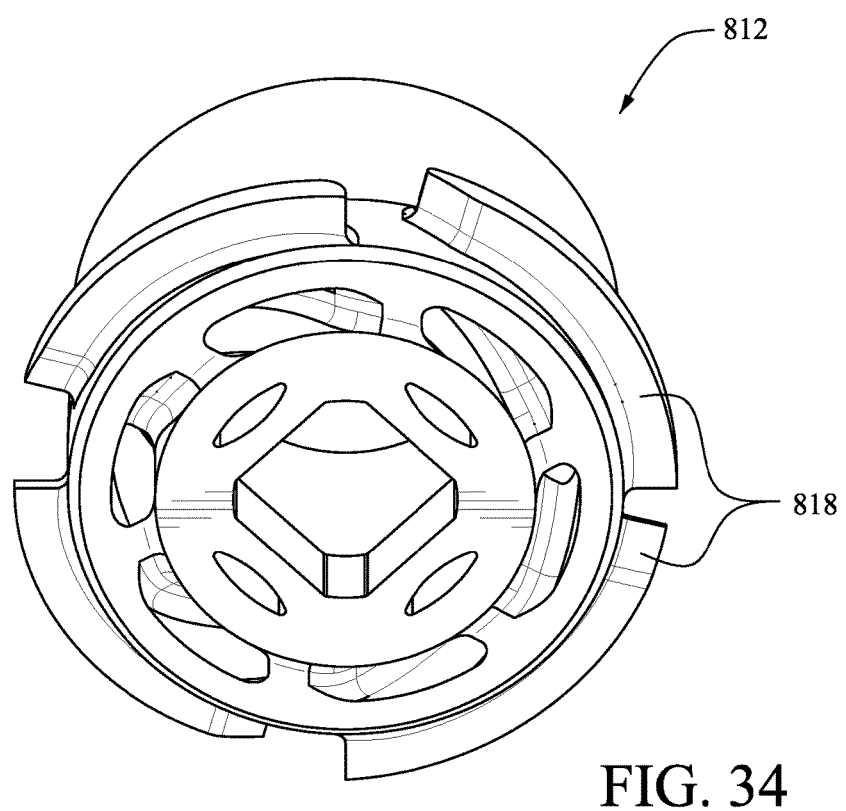
FIGS. 34-36 are perspective views of the rotor in the FIG. 29 embodiment.
Figure 35:
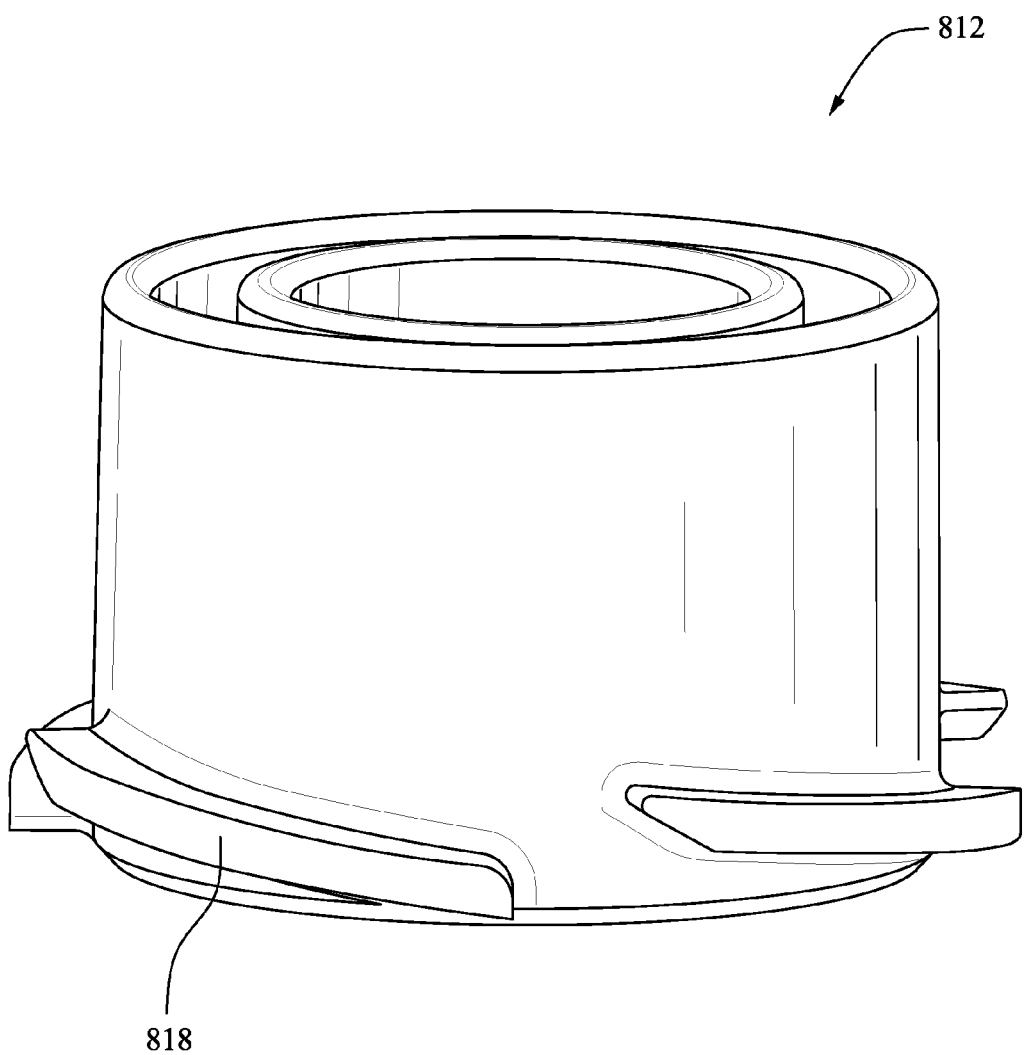
Figure 36:
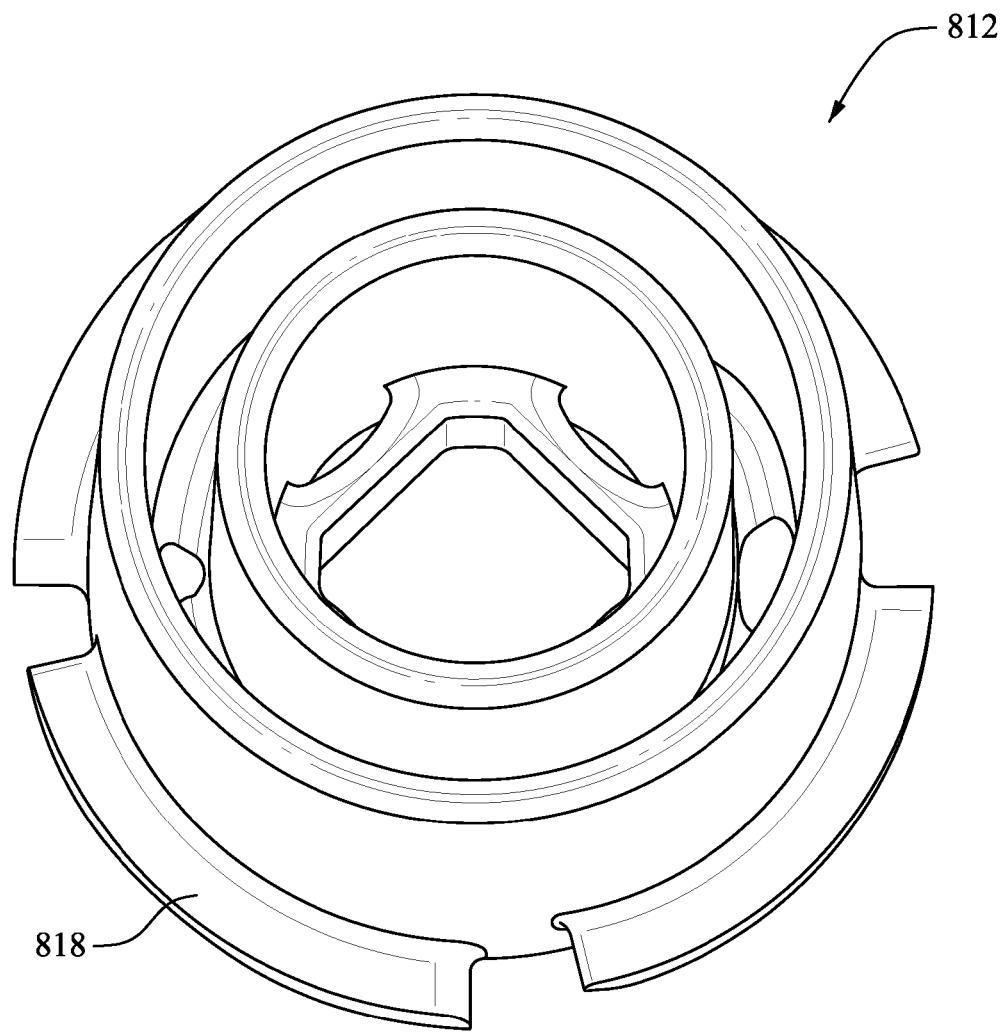

FIG. 33 is a perspective view of the housing 16 showing openings 820 cut in the inner rings to allow fluid to move from one side of the rotor to the other as the rotor moves axially. FIGS. 34-36 are various perspective views of the rotor 812 showing the propeller blades 818. As shown in FIGS. 31 and 32, the hub 822 is preferably machined out of brass square stock and press fit onto the shaft to enable transmission of torque to the rotor while also allowing axial movement of the rotor. The hub 822 also provides support for the compression spring 38.

The exemplary sprinklers of FIGS. 29 and 30 are shown in the position used when water is supplied through a drop tube, but the same sprinkler is often used in the inverted position, for example, on top of a center pivot irrigation machine.

Figure 37:
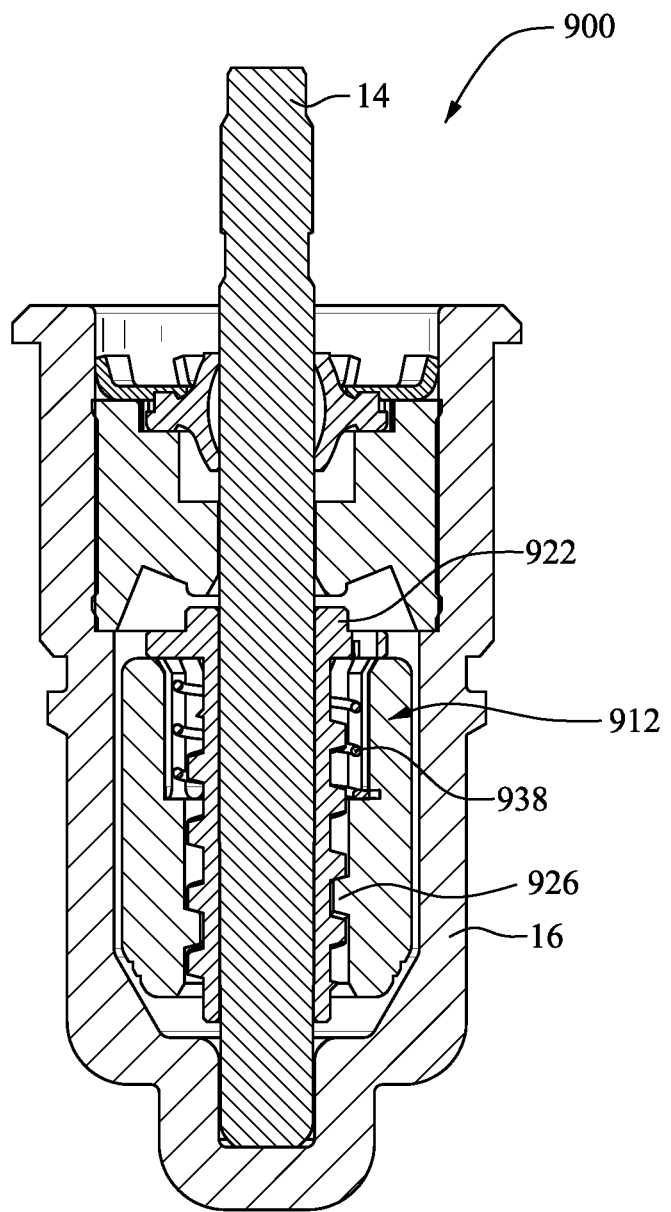
FIG. 37 is a sectional view of an alternative embodiment in an at-rest position and low-speed position.
Figure 38:
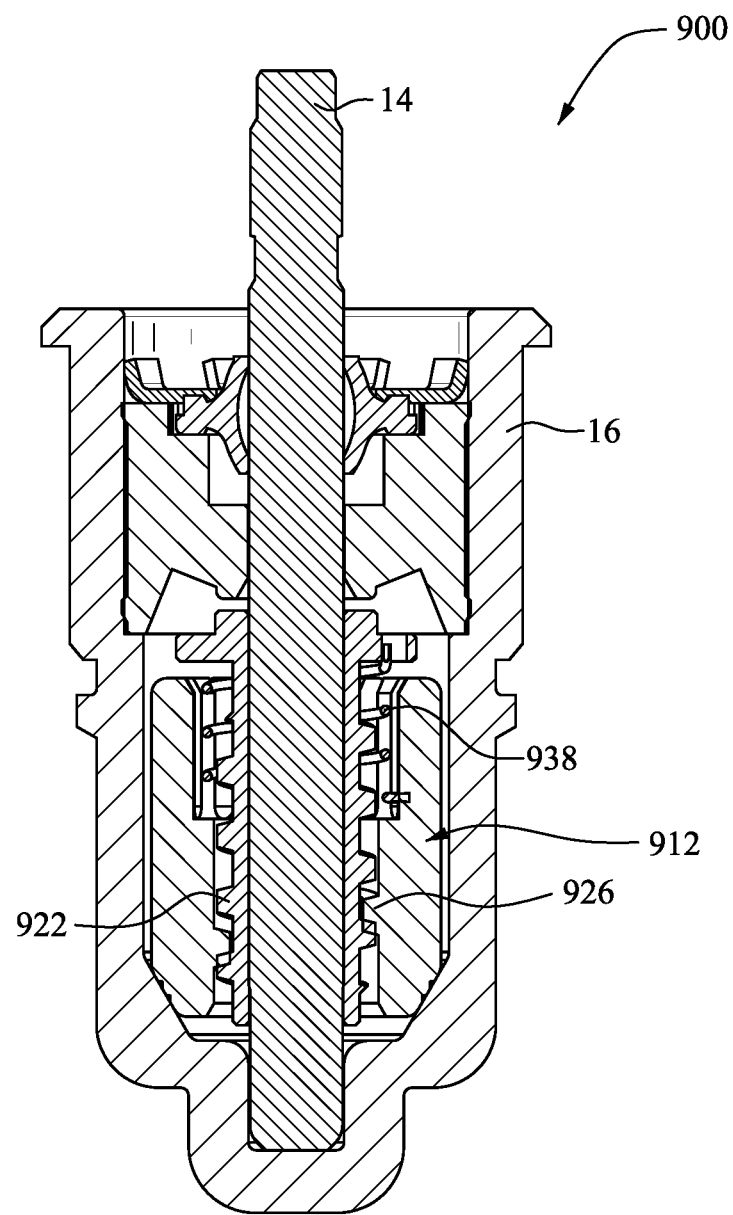
FIG. 38 is a sectional view of the FIG. 37 embodiment in a high-braking position.
Figure 39:
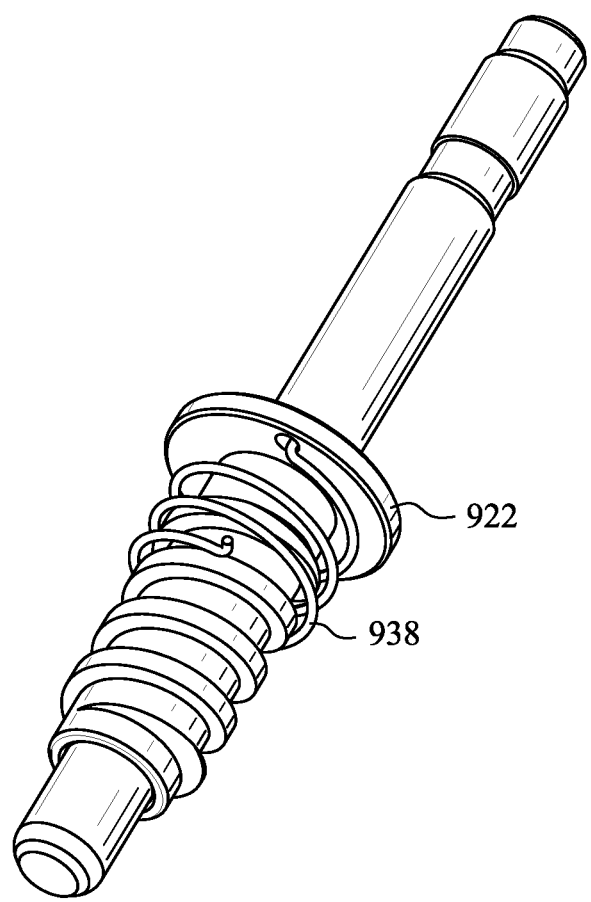
FIG. 39 is a perspective view of the threaded hub and torsion spring in the FIG. 37 embodiment.
Figure 40:
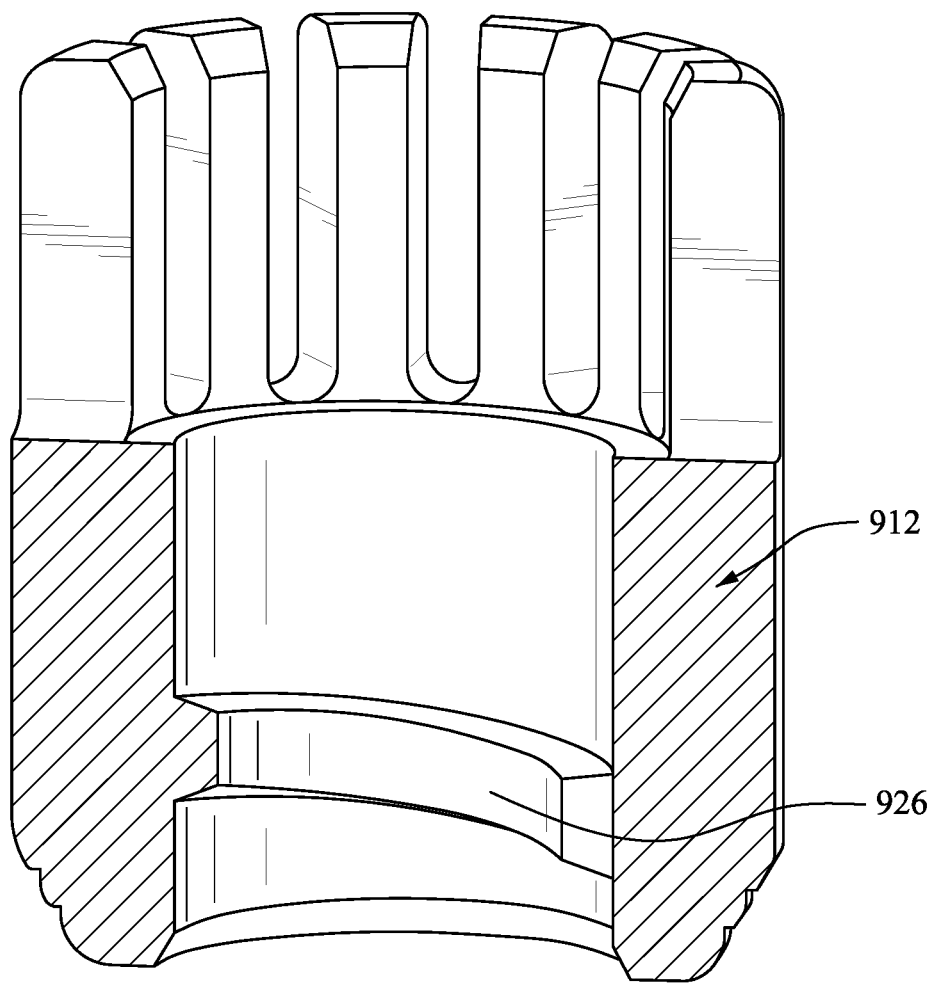
FIGS. 40 and 41 show the rotor of the FIG. 37 embodiment.
Figure 41:
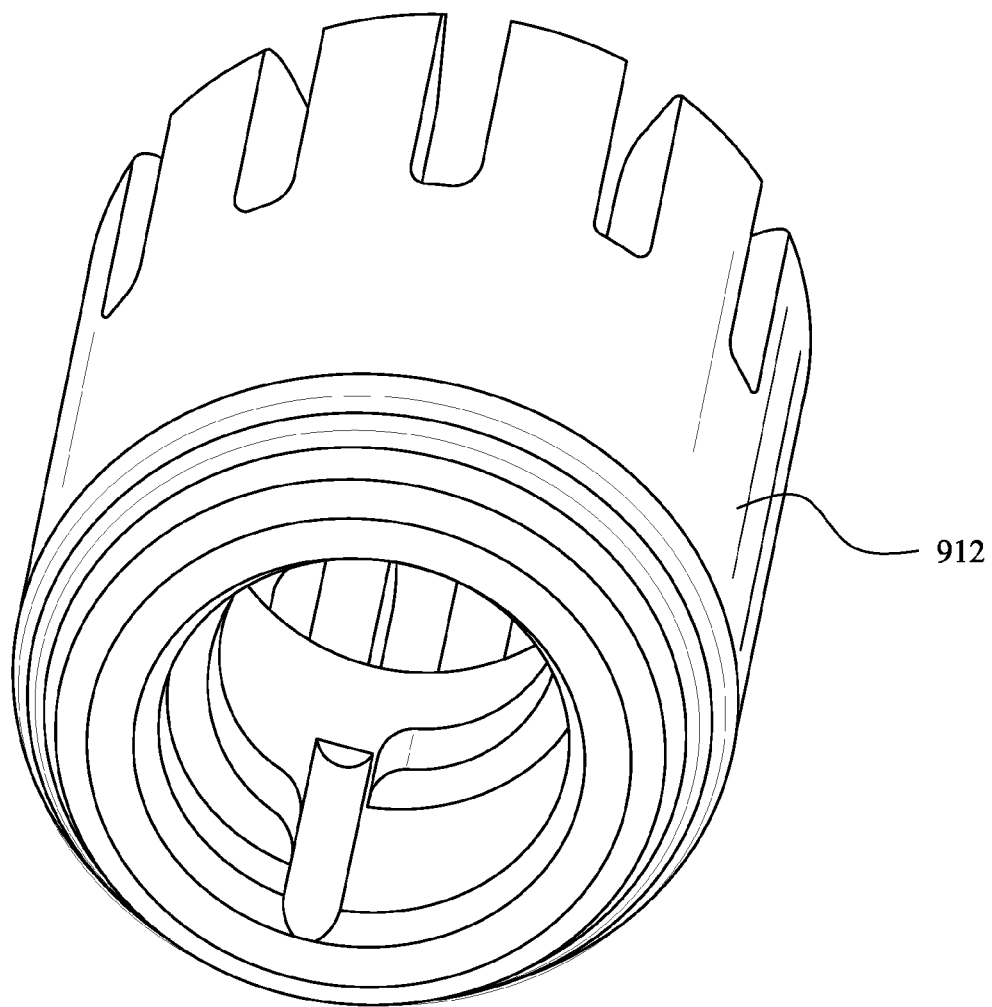
Figure 42:
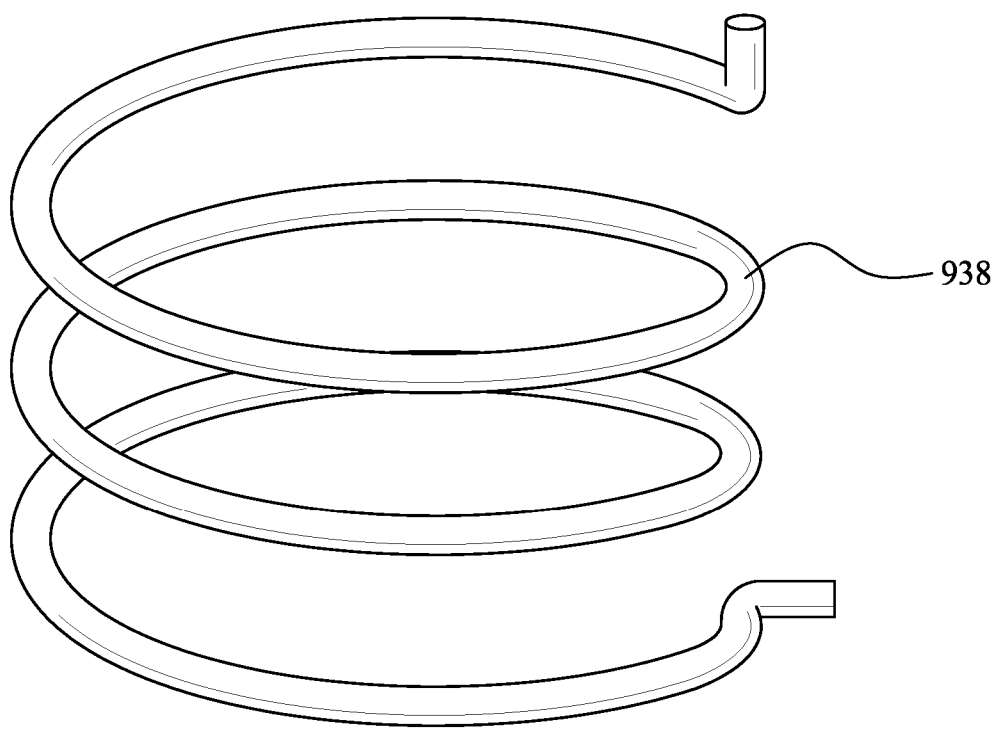
FIG. 42 is a perspective view of the torsion spring in the FIG. 37 embodiment.

FIGS. 37-42 show yet another alternative embodiment. FIG. 37 is a cross section of the assembly 900 when it is in the at-rest position and low-speed position. The unit is filled with a viscous fluid. The rotor 912 is biased to the up position by a torsion spring 938. The threaded hub 922 is press fit to the shaft 14 so that it will rotate with the shaft. As it begins to rotate, the rotor 912 also rotates with the threaded hub 922, until such time that the rotation speed becomes high enough that the viscous shear between the rotor 912 and the housing 16 gets high enough to overcome the torsion spring 938 and the viscous shear between the rotor 912 and the threaded hub 922 to rotate the rotor 912 relative to the threaded hub 922. The rotor 912 includes a thread segment 926 (similar to the thread segment 526 described with reference to FIGS. 17-20) engaged with the threaded hub 922. Relative rotation between the rotor 912 and the threaded hub 922 drives the rotor 912 down toward the position shown in FIG. 38 by virtue of the thread segment 926 engaging the threads of the threaded hub 922. In this position, the lower end of the rotor is contacting the housing, creating mechanical frictional torque in addition to the viscous shear torque. FIG. 39 is a detailed view of the threaded hub 922 and the torsion spring 938. FIGS. 40 and 41 are different views of the rotor 912, and FIG. 42 is a detailed view of the torsion spring 938.

FIGS. 43-47 show an alternative embodiment utilizing helically ramped ball grooves to axially displace the rotor on the shaft. A hub assembly 1012 includes a hub member 1013 secured to the shaft 14 for rotation with the shaft 14. The rotor 1014 is coupled with the shaft 14 by way of the hub member 1013 in a frictional engagement. As shown, the hub member 1013 includes a shoulder 1016 that supports a spring member 1038 between the hub member 1013 and a shoulder 1018 on an internal surface of the rotor 1014.

Figure 43:
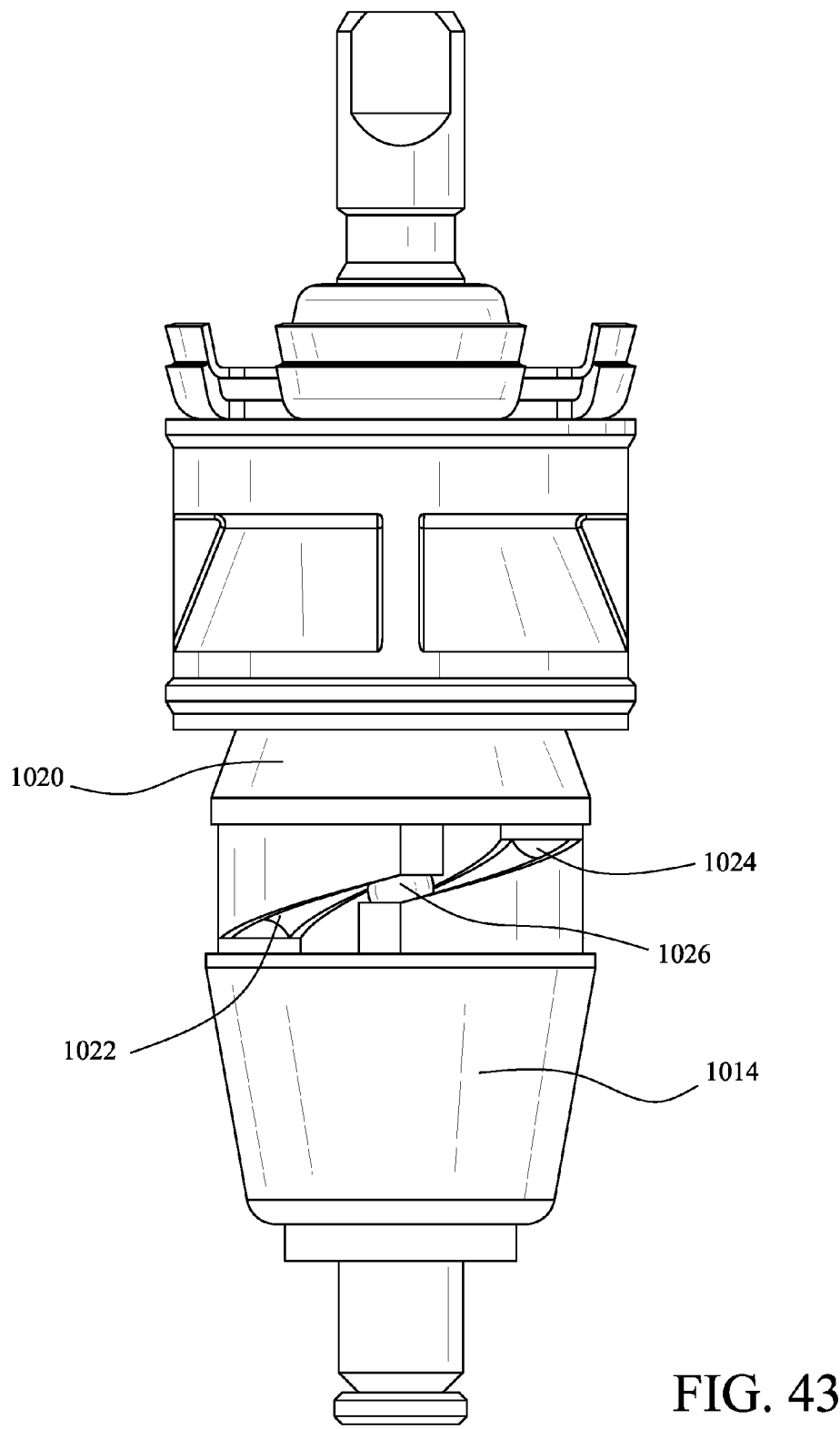
FIG. 43 shows another alternative embodiment utilizing ramps to control an axial position of the rotor.
Figure 44:
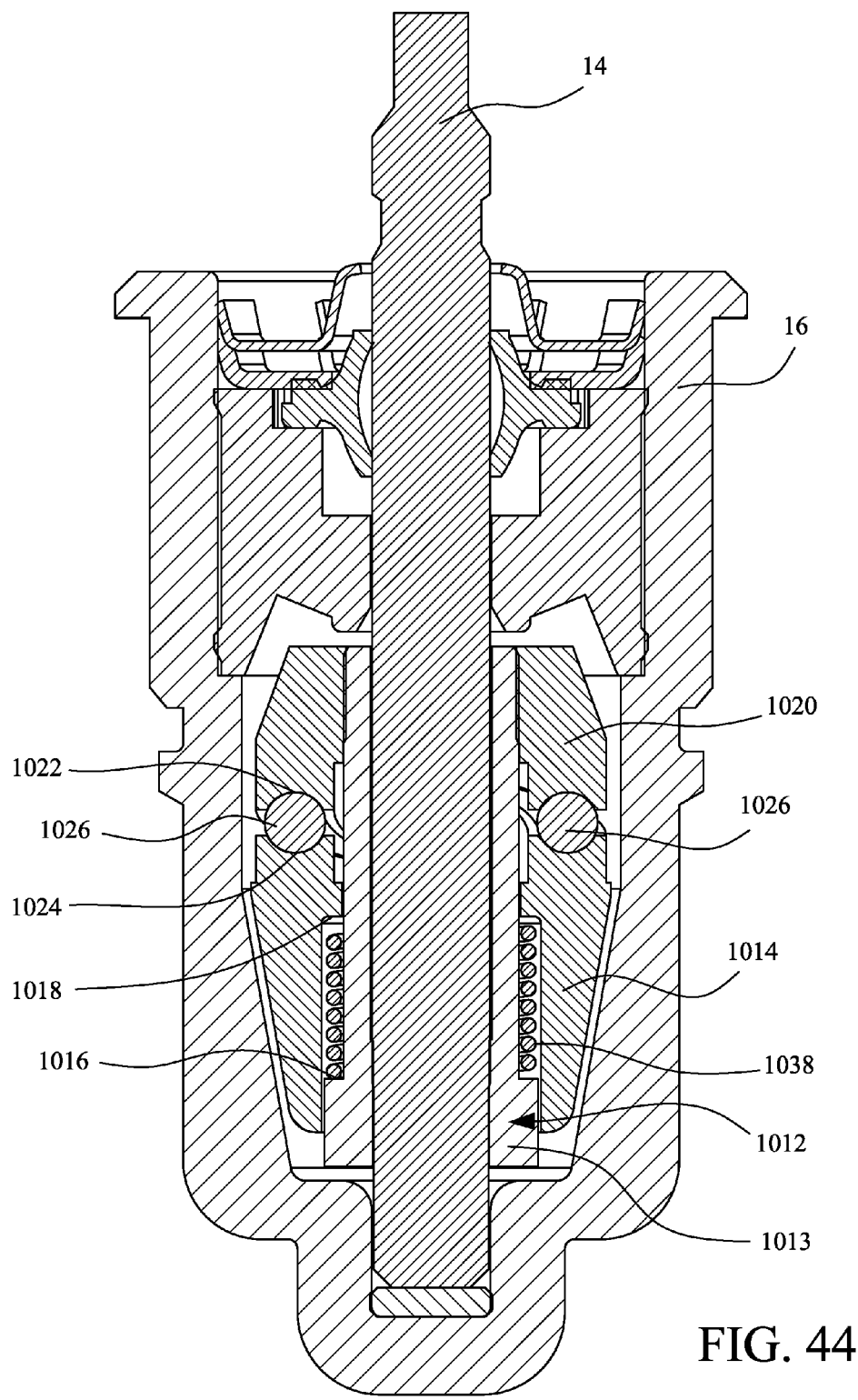
FIG. 44 is a sectional view of the FIG. 43 embodiment in a low torque position.
Figure 46:
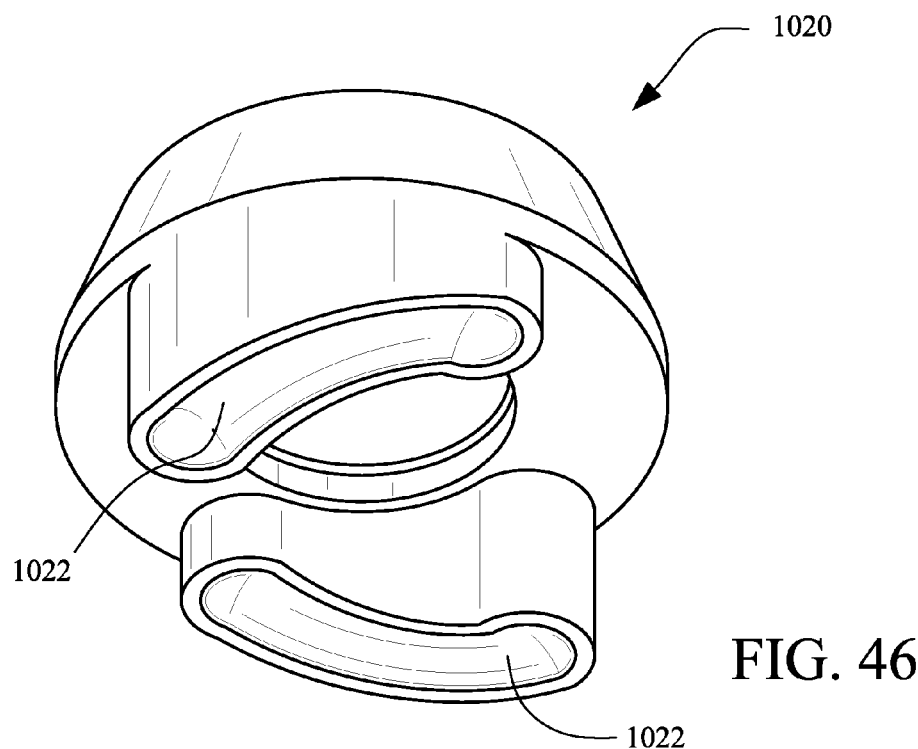
FIG. 46 is a detailed perspective view of a ramped ball groove member.
Figure 47:
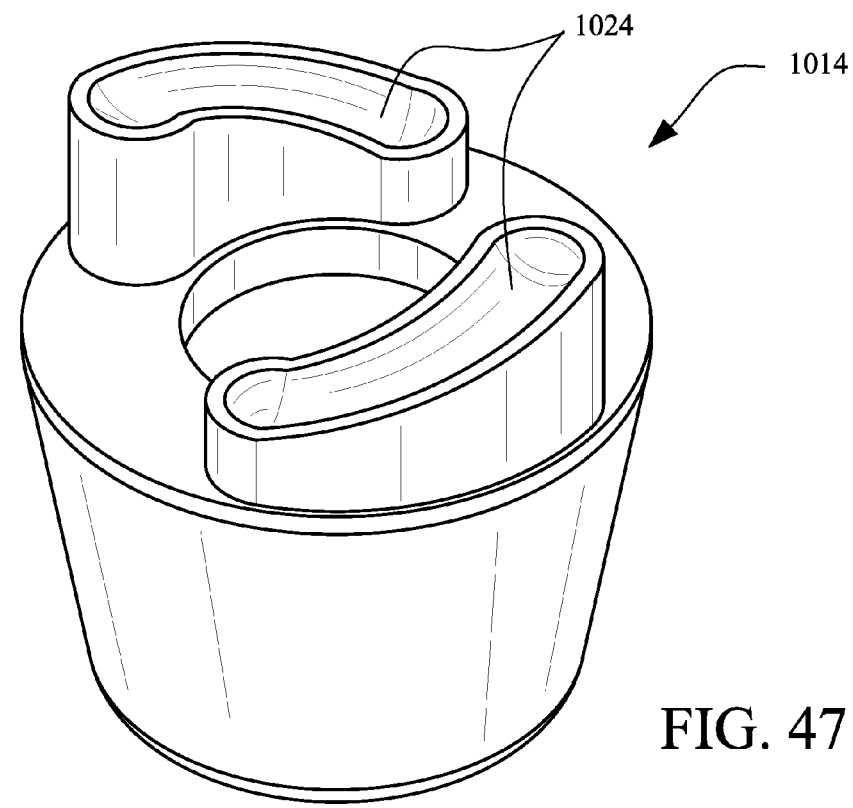
FIG. 47 is a detailed perspective view of the rotor for the FIG. 43 embodiment.

The hub assembly 1012 also includes a ramped ball groove member 1020 secured to the hub member 1013 for rotation with the shaft 14. The ramped ball groove member 1020 includes a first ramped ball groove 1022. The rotor 1014 includes a second ramped ball groove 1024 disposed in a cooperable facing relationship with the first ramped ball groove 1022 as shown in FIG. 43. At least one ball 1026 is positioned between the first ramped ball groove 1022 and the second ramped ball groove 1024. Detailed perspective views of the ramped ball groove member 1020 and the rotor 1014 are shown in FIGS. 46 and 47, respectively. The ramped ball groove member 1020 and the rotor 1014 are configured such that rotation of the shaft 14 and the ramped ball groove member 1020 relative to the rotor 1014 effects axial displacement of the rotor 1014 on the shaft 14 by displacement of the first ramped ball groove 1022 relative to the second ramped ball groove 1024. In a preferred construction, the assembly utilizes two first ramped ball grooves 1022, two second ramped ball grooves 1024 and two balls 1026.

Figure 45:
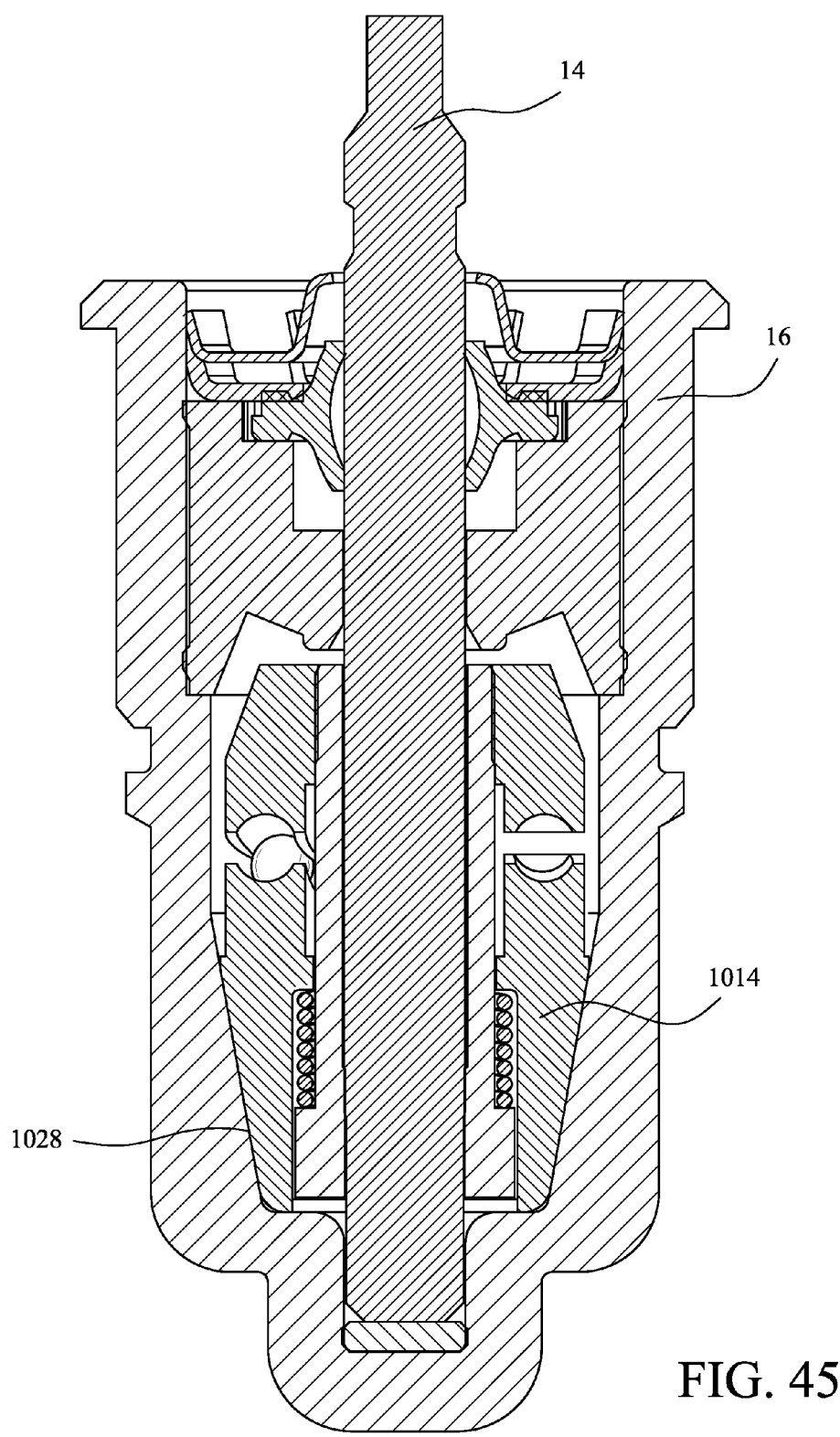
FIG. 45 is a sectional view of the FIG. 43 embodiment in a high torque position.

Like previously described embodiments, the housing 16 may include an interior wall having a tapered section 1028. A clearance amount between the rotor 1014 and the housing interior wall is thus varied based on an axial position of the rotor 1014 on the shaft 14. FIG. 45 shows the rotor in a max torque position with the rotor 1014 substantially coincident with the tapered section 1028 of the housing interior wall. The rotor is thus displaceable by the ramped ball grooves 1022, 1024 between a low torque position (FIG. 44) and a high torque position (FIG. 45).

As in previous embodiments, the housing 16 is full of viscous fluid, so as rotation speed increases, torque on the rotor 1014 increases, which drives the rotor 1014 down against the spring 1038 due to the action of the ramped ball grooves 1022, 1024 and the balls 1026. As rotation speed decreases, torque on the rotor 1014 decreases, and the spring 1038 returns the rotor 1014 toward the minimum torque position due to the action of the ramped ball grooves 1022, 1024 and the balls 1026. The design of this embodiment utilizes a lower friction connection to more easily return the rotor 1014 to the minimum torque position when the input torque is reduced or ceases.

Figure 48:
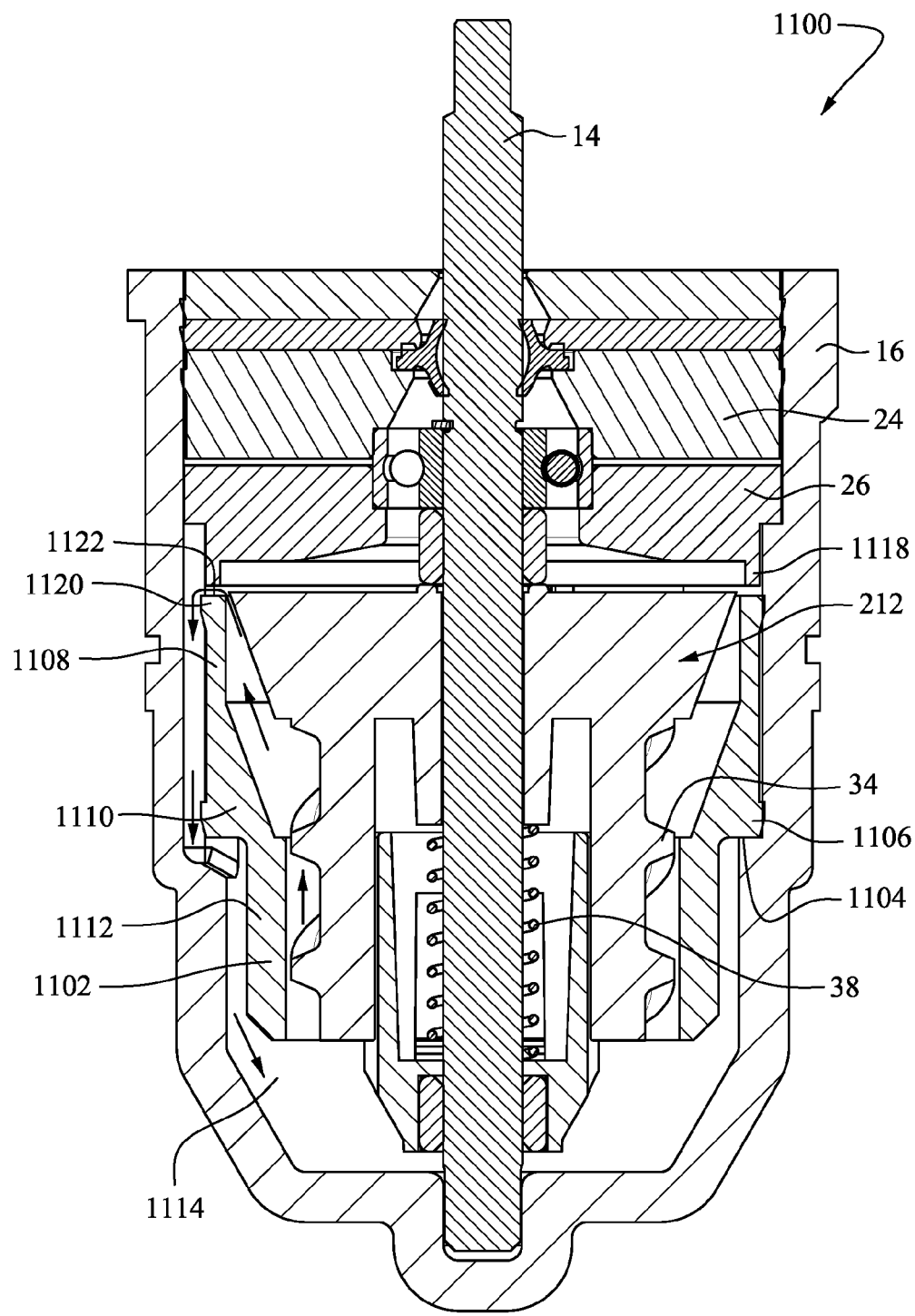
FIG. 48 shows an alternative embodiment incorporating bypass channels in the housing to control a circulating pressure of the viscous fluid.
Figure 49:
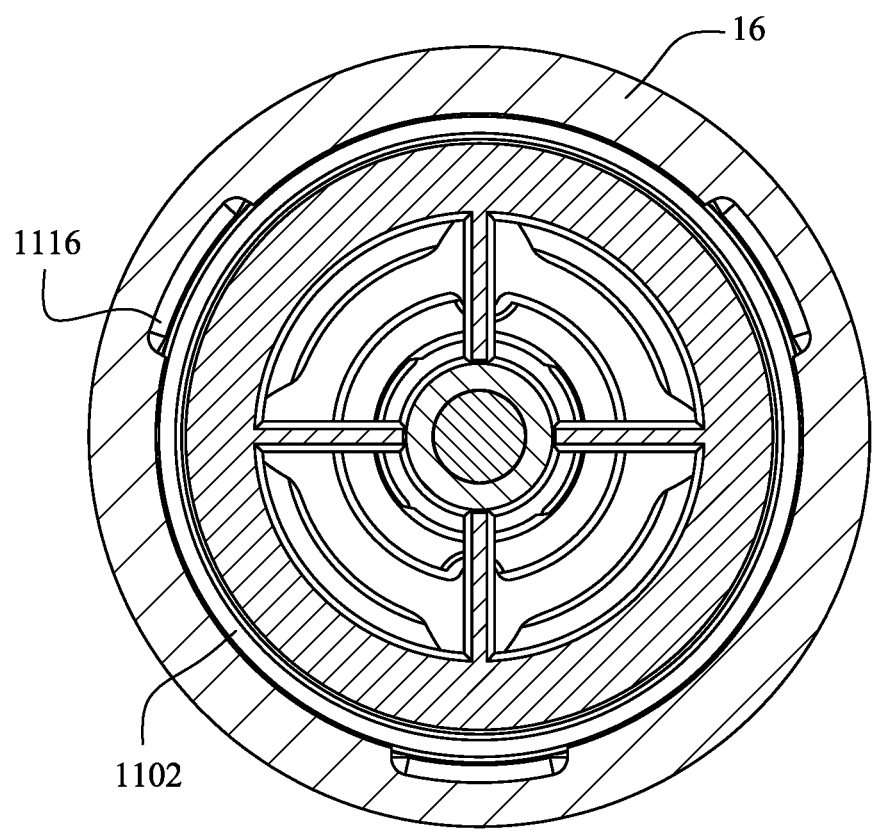
FIG. 49 is a sectional view of the FIG. 48 embodiment.
Figure 50:
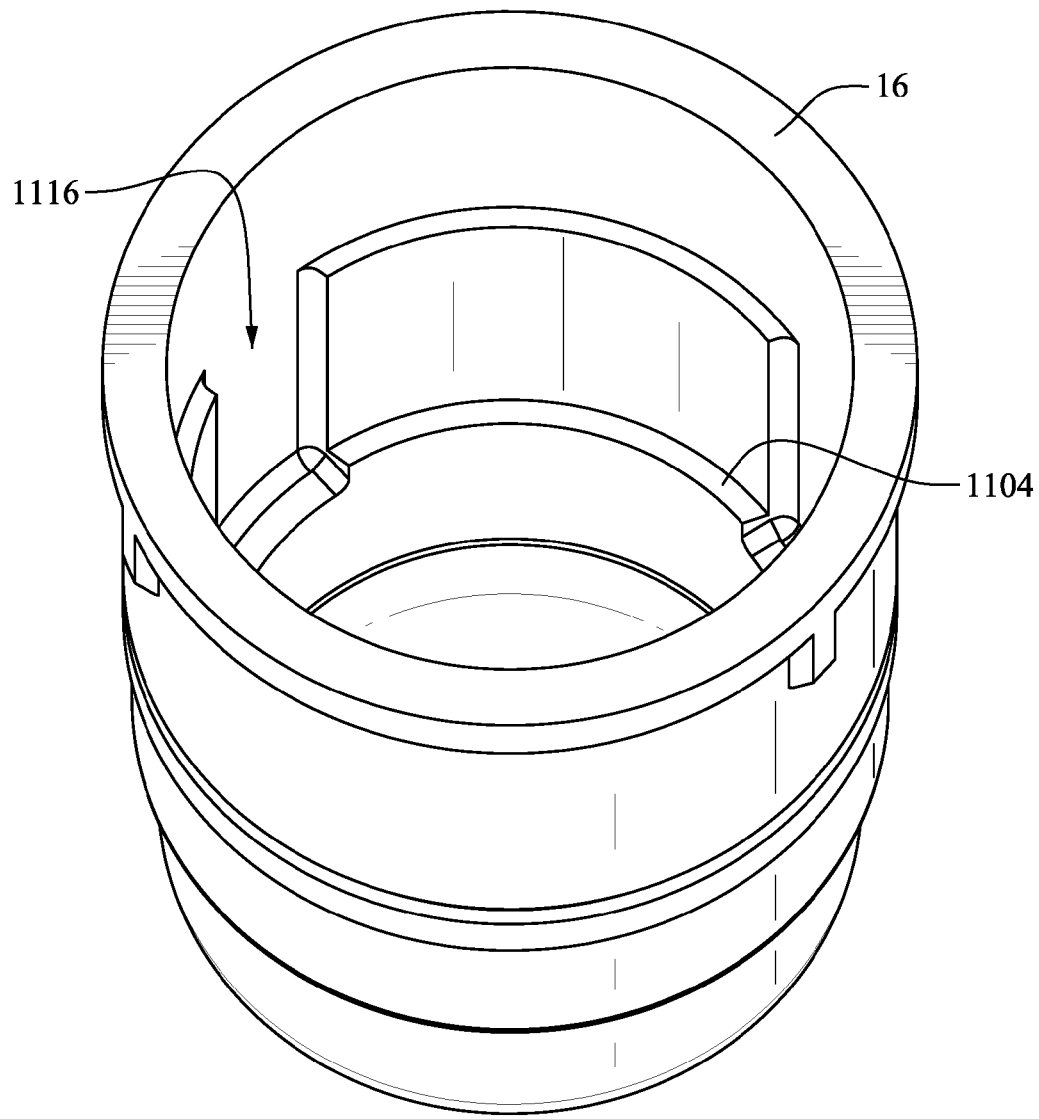
FIG. 50 is a perspective view of the housing in the FIG. 48 embodiment.

FIGS. 48-50 show an alternative embodiment incorporating bypass channels in the housing to control a circulating pressure of the viscous fluid. In this embodiment, the rotational speed control device 1100 includes a drive control ring 1102 interposed between the housing 16 and the rotor 212. An interior wall of the housing 16 includes a shoulder 1104 that defines a circumferential platform. The drive control ring 1102 includes a corresponding shoulder 1106 that is supported on/secured to the circumferential platform defined by the shoulder 1104. As shown, an interior surface of the drive control ring 1102 includes varying diameters along an axial length thereof. For example, the drive control ring 1102, from top to bottom in FIG. 48, may include a top portion 1108, a tapered portion 1110 that narrows an interior diameter of the drive control ring 1102 along its axial length, and a bottom part 1112 that defines the smallest diameter portion of the drive control ring 1102. Similar to previously-described embodiments, a braking torque between the rotor 212 and the housing 16 and/or between the rotor 212 and the drive control ring 1102 is varied according to an axial position of the rotor 212 on the shaft 14.

In this embodiment, the rotational speed control device 1100 includes a fluid circuit 1114 through which the viscous fluid flows as the impeller 34 rotates with the rotor 212. The fluid circuit 1114 may be defined by a fluid passageway between the housing 16 and the drive control ring 1102 and between the drive control ring 1102 and the rotor 212. It has been discovered that the amount of thrust the rotor 212 develops as it pumps the viscous fluid through the mechanism can be adjusted by changing a back pressure generated by the displacement of the viscous fluid by action of the impeller 34. Increasing the back pressure increases the thrust that the rotor 212 develops and also the total braking force of the rotational speed control device 1100. Decreasing the back pressure reduces the thrust the rotor 212 develops and reduces the total braking force of the speed control device 1100. By changing the back pressure and/or the spring mechanism 38, the reaction time of the rotational speed control device to changes in input torque can be controlled. Additionally, the magnitude of input torque that the device can control can be manipulated.

In an exemplary embodiment, with reference to FIGS. 49 and 50, the housing 16 may be provided with one or more bypass channels 1116, creating a flow space between the drive control ring 1102 and the housing 16. The bypass channels 1116 are defined by grooves in the housing wall. The grooves may be molded into the housing wall, and the fluid circuit/flow channels 1114 are formed when the drive control ring 1102 is pressed into the housing 16, which forms an outer wall of the fluid circuit 1114. As shown, the housing 16 may include three bypass channels 1116. In some embodiments, the channels 1116 extend through and past the shoulder 1104 in the housing 16. The back pressure can be changed/controlled by changing the total cross-sectional area of the bypass channels 1116. Alternatively, the back pressure may be adjusted by inserting a restrictor into the flow channel. With continued reference to FIG. 48, the bearing support 26 is disposed in the housing 16 adjacent the rotor 212. The bearing support 26 may include a gap restrictor ring 1118 on a rotor-facing side that is substantially axially aligned with a proximal edge 1120 of the drive control ring 1102 to define the back pressure control gap 1122.

In some embodiments, the drive control ring 1102 may be positioned in the housing 16 without defining the flow circuit 1114. In this construction, the braking torque is a function of a distance between an interior surface of the drive control ring 1102 and the rotor 212.

The balancing springs in the various embodiments can be replaced with opposingly oriented magnets to generate the balancing force.

It should be noted that the operation of this device relies on the relative motion between the rotor and the housing. Therefore, it should be recognized that the device could be designed to have the housing rotate about a nonrotating shaft and rotor rather than the described exemplary embodiments where the shaft and rotor rotate within a stationary housing.

The brake assembly can be mounted in various arrangements including ones where the shaft can be driven by a gear, rather than directly by a deflector plate, such as when used in a Big Gun Rotator™.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A rotational speed control device comprising:
a housing containing a viscous fluid;
a shaft disposed in the housing and rotatable relative to the housing;
a rotor coupled with the shaft for rotation with the shaft relative to the housing in the viscous fluid, wherein the rotor is axially displaceable along the shaft, the rotor including an impeller that is oriented to displace the rotor axially on the shaft in a first direction with rotation of the rotor;
a spring mechanism disposed in the housing and acting on the rotor, the spring mechanism biasing the rotor axially on the shaft in a second direction, opposite from the first direction; and
a fluid circuit through which the viscous fluid flows as the impeller rotates with the rotor,
wherein a braking torque between the rotor and the housing is varied according to an axial position of the rotor on the shaft.

2. A rotational speed control device according to claim 1, further comprising a drive control ring positioned between the rotor and the housing, wherein the braking torque is a function of a distance between an interior surface of the drive control ring and the rotor, and wherein the interior surface of the drive control ring includes varying diameters along an axial length thereof.

3. A rotational speed control device according to claim 2, wherein the fluid circuit is defined by a fluid passageway between the housing and the drive control ring and between the drive control ring and the rotor.

4. A rotational speed control device according to claim 3, wherein the housing comprises at least one bypass channel in an interior wall, the bypass channel defining the fluid passageway between the housing and the drive control ring.

5. A rotational speed control device according to claim 4, comprising three bypass channels in the interior wall of the housing.

6. A rotational speed control device according to claim 4, further comprising a bearing support disposed in the housing adjacent the rotor, the bearing support and the drive control ring defining a back pressure control gap in the fluid circuit.

7. A rotational speed control device according to claim 6, wherein the bearing support comprises a gap restrictor ring on a rotor-facing side, the gap restrictor ring being substantially axially aligned with a proximal edge of the drive control ring to define the back pressure control gap.

8. A rotational speed control device comprising:
a housing containing a viscous fluid;
a shaft disposed in the housing and rotatable relative to the housing;
a rotor coupled with the shaft for rotation with the shaft relative to the housing in the viscous fluid, wherein the rotor is axially displaceable along the shaft, the rotor including an impeller that is oriented to displace the rotor axially on the shaft in a first direction with rotation of the rotor;
a spring mechanism disposed in the housing and acting on the rotor, the spring mechanism biasing the rotor axially on the shaft in a second direction, opposite from the first direction; and
a drive control ring positioned between the rotor and the housing, an interior surface of the drive control ring including varying diameters along an axial length thereof,
wherein a braking torque between the rotor and the drive control ring is varied according to an axial position of the rotor on the shaft.

9. A rotational speed control device according to claim 8, wherein the braking torque is a function of a distance between the interior surface of the drive control ring and the rotor.

10. A rotational speed control device according to claim 8, further comprising a fluid circuit defined between the housing and the drive control ring and between the drive control ring and the rotor, wherein the fluid circuit is configured to control a back pressure of the viscous fluid in the housing that is displaced by rotation of the impeller.

11. A rotational speed control device according to claim 10, wherein the housing comprises at least one bypass channel in an interior wall, the bypass channel defining the fluid passageway between the housing and the drive control ring.

12. A rotational speed control device according to claim 11, wherein the housing comprises an interior shoulder, and wherein the drive control ring is supported on the interior shoulder of the housing, the at least one bypass channel extending through the interior shoulder.

13. A rotational speed control device according to claim 10, further comprising a bearing support disposed in the housing adjacent the rotor, the bearing support and the drive control ring defining a back pressure control gap in the fluid circuit.

14. A rotational speed control device according to claim 13, wherein the bearing support comprises a gap restrictor ring on a rotor-facing side, the gap restrictor ring being substantially axially aligned with a proximal edge of the drive control ring to define the back pressure control gap.

15. A rotational speed control device comprising:
a housing containing a viscous fluid;
a shaft disposed in the housing and rotatable relative to the housing;
a rotor coupled with the shaft for rotation with the shaft relative to the housing in the viscous fluid, wherein the rotor is axially displaceable along the shaft, the rotor including an impeller that is oriented to displace the rotor axially on the shaft in a first direction with rotation of the rotor;
a spring mechanism disposed in the housing and acting on the rotor, the spring mechanism biasing the rotor axially on the shaft in a second direction, opposite from the first direction; and
a fluid circuit through which the viscous fluid flows as the impeller rotates with the rotor, wherein a braking torque between the rotor and the housing is varied according to an axial position of the rotor on the shaft, and wherein a back pressure of the viscous fluid is a function of a sectional area of the fluid circuit.

16. A rotational speed control device according to claim 15, further comprising a drive control ring positioned between the rotor and the housing, wherein the braking torque is a function of a distance between an interior surface of the drive control ring and the rotor, and wherein the interior surface of the drive control ring includes varying diameters along an axial length thereof.

17. A rotational speed control device according to claim 16, wherein the fluid circuit is defined by a fluid passageway between the housing and the drive control ring and between the drive control ring and the rotor.

18. A rotational speed control device according to claim 16, wherein an interior wall of the housing comprises a shoulder defining a circumferential platform, and wherein the drive control ring is positioned on the circumferential platform.

* * * * *